(12) United States Patent
Kubota et al.

(10) Patent No.: US 6,233,596 B1
(45) Date of Patent: May 15, 2001

(54) MULTIPLE SUM-OF-PRODUCTS CIRCUIT AND ITS USE IN ELECTRONIC EQUIPMENT AND MICROCOMPUTERS

(75) Inventors: Satoshi Kubota; Makoto Kudo; Yoshiyuki Miyayama, all of Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/066,348

(22) PCT Filed: Sep. 2, 1997

(86) PCT No.: PCT/JP97/03061

§ 371 Date: Jun. 5, 1998

§ 102(e) Date: Jun. 5, 1998

(87) PCT Pub. No.: WO98/10354

PCT Pub. Date: Mar. 12, 1998

(30) Foreign Application Priority Data

Sep. 4, 1996 (JP) .................................................. 8-234565
May 8, 1997 (JP) .................................................. 9-135922

(51) Int. Cl.[7] ...................................................... G06F 9/302
(52) U.S. Cl. ............................ 708/603; 708/523; 712/221
(58) Field of Search .................................... 708/603, 501, 708/523; 712/221

(56) References Cited

U.S. PATENT DOCUMENTS

| 5,053,987 | 10/1991 | Genusov et al. | 364/736 |
| 5,249,148 | 9/1993 | Catherwood et al. | 364/746 |
| 5,793,661 | * 8/1998 | Dulong et al. | 708/603 |
| 5,953,241 | * 9/1999 | Hansen et al. | 708/603 |

FOREIGN PATENT DOCUMENTS

| 0 646 873 A2 | 4/1995 | (EP) . |
| 0 655 678 A1 | 5/1995 | (EP) . |
| 3-252783 | 11/1991 | (JP) . |
| 4-227540 | 8/1992 | (JP) . |
| 7-134701 | 5/1995 | (JP) . |
| WO98/10354 | 3/1998 | (WO) . |

OTHER PUBLICATIONS

B. Fine et al.: "Considerations for Selecting a DSP Processor (ADSP–2101 vs. TMS320C50)" Microprocessors and Microsystems, GB, IPC Business Press Ltd. London, vol. 18, No. 6, Jul. 1, 1994, pp. 351–362.
Katsuhiko Ueda et al.: "A 16–Bit Digital Signal Processor with Specially Arranged Multiply–Accumulator for Low Power Consumption" IEICE Transactions on Electronics, JP, Institute of Electronics Information and Comm. Eng. Tokyo, vol. E78–C, No. 12, Dec. 1, 1995, pp. 1709–1716.
Nikkei Electronics No. 568, Nov. 23, 1992, pp. 87–134.

* cited by examiner

Primary Examiner—David H. Malzahn
(74) Attorney, Agent, or Firm—Oliff & Berridge, PLC

(57) ABSTRACT

An objective of this invention is a design that improves the memory usage ratio and execution speed of a sum-of-products operation instruction, improves the critical path of sum-of-products operations, and prevents overflows. A sum-of-products operation circuit executes sum-of-products operations a number of times that is specified by number-of-executions information comprised within a sum-of-products operation instruction, under the control of a control circuit. The number of times the sum-of-products operation is to be executed is set into a register, that number is decremented every time one cycle of the sum-of-products operation ends, and the sum-of-products operation instruction ends when the value in the register reaches zero. If an interrupt is received during the execution of a plurality of sum-of-products operations, execution of the sum-of-products operations resumes after the interrupt processing. First and second sum-of-products input data are read at the same time by a single memory access. A 16-bit×16-bit multiplication result is added by a 32-bit adder, and upper 32-bit data is either incremented or decremented when a carry or borrow is generated by a lower 32-bit add.

22 Claims, 19 Drawing Sheets

MAC %R$_{S1}$, %R$_{S2}$

MAC %R$_{S1}$, %R$_{S2}$

MAC %R$_{S1}$, %R$_{S2}$

MAC %R$_{S1}$, %R$_{S2}$

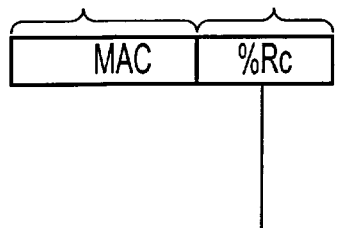
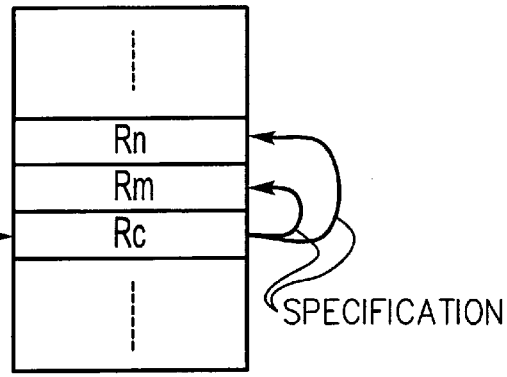
FIG. 6A
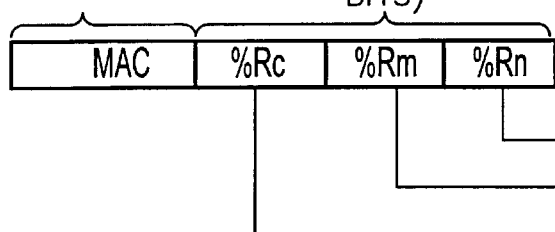
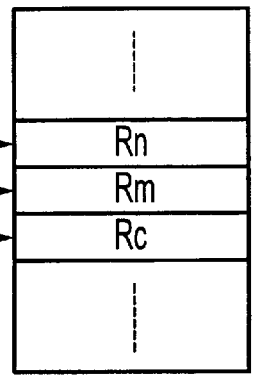
FIG. 6B
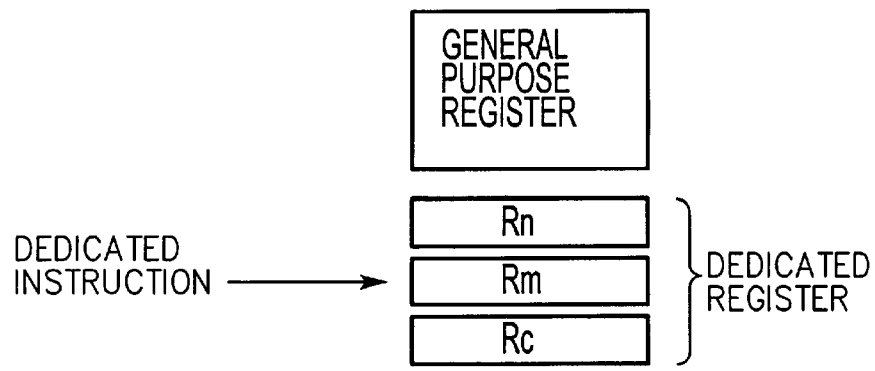
FIG. 6C

MULTIPLE SUM-OF-PRODUCTS CIRCUIT AND ITS USE IN ELECTRONIC EQUIPMENT AND MICROCOMPUTERS

BACKGROUND OF THE INVENTION

1. Field of the Invention

This invention relates to an information processing circuit, a microcomputer, and electronic equipment.

2. Description of Related Art

Demand has increased recently for a microcomputer that is capable of executing sum-of-products operation instructions rapidly. If a microcomputer can execute sum-of-products operations rapidly, it will be able to act as a digital signal processor (DSP), a dedicated image-processing IC, or a dedicated sound-processing IC, which would lower the costs of completed products and help simplify systems.

A sum-of-products operation instruction is executed by a microcomputer as described below. First of all, first sum-of-products input data has been stored in a first area in memory and second sum-of-products input data has been stored in a second area thereof. The microcomputer then uses two addresses that are specified by the contents of internal general-purpose registers to read from memory the first and second sum-of-products input data stored in these first and second areas. It then multiplies these first and second sum-of-products input data and a sum-of-products operation circuit adds the result to an internal register for the sum-of-products result (a MAC register)

However, a microcomputer that is capable of executing a sum-of-products operation instruction has the following problems:

(1) If the microcomputer is to execute the sum-of-products operations a plurality of times, the program must be written to have a sequence of the same number of sum-of-products operation instructions as the number of times that the sum-of-products operation instruction is to be repeated. Thus, if the number of times the sum-of-products operation is to be executed is increased, it is necessary to store a corresponding number of sum-of-products operation instructions, which increases the memory capacity required. One technique for solving this problem that could be considered is to write a program which executes sum-of-products operations while decrementing the number of times the sum-of-products operation is to be executed, then escapes from this loop when the number of executions reaches zero. This technique, however, increases the time required for executing each sum-of-products operation.

(2) If sum-of-products operations are executed sequentially, the execution time for one operation is limited by the time taken to read the first and second sum-of-products input data from memory.

(3) Up until now, first and second sum-of-products input data that are each of 16 bits, for example, are multiplied and the result of the multiplication is added to a 48-bit MAC register (a register for the sum-of-products result). In such a case, it is necessary to complete addition of the 48-bit data within one clock period, so this add processing becomes a critical path. Since the MAC register is only 48 bits long, it soon overflows if the sum-of-products operation is to be executed a large number of times.

SUMMARY OF THE INVENTION

The present invention was devised with the aim of solving the above described problems and has as an objective thereof the provision of an information processing circuit, microcomputer, and electronic equipment that are designed to improve the memory usage ratio of a program that uses sum-of-products operation instructions.

Another objective of this invention is to provide an information processing circuit, microcomputer, and electronic equipment that enable improvements in the speed with which sum-of-products operation instructions are executed.

A further objective of this invention is to provide an information processing circuit, microcomputer, and electronic equipment that are designed to solve the problem of the critical path of sum-of-products operations and prevent overflow during sum-of-products operations.

In order to solve the above described problems, there is provided an information processing circuit in accordance with a first aspect of this invention, comprising: a control circuit for receiving instructions that comprise a sum-of-products operation instruction, analyzing these instructions, and controlling the execution of these instructions; and a sum-of-products operation circuit for executing a sum-of-products operation under the control of the control circuit, based on the sum-of-products operation instruction; wherein the sum-of-products operation circuit executes a sum-of-products operation a number of times specified by number-of-executions information comprised within the sum-of-products operation instruction.

In accordance with this aspect of the invention, number-of-executions information for specifying the number of times the sum-of-products operation is to be executed is comprised within the sum-of-products operation instruction. The sum-of-products operation circuit executes sum-of-products operations a number of times that is specified by the number-of-executions information comprised within the sum-of-products operation instruction, under the control of the control circuit. This makes it possible to use a single instruction to execute sum-of-products operations a desired number of times. It is therefore possible to greatly reduce the memory capacity required for the sum-of-products operations and thus improve the memory usage ratio, in comparison with the technique using a sequence of the same number of sum-of-products operation instructions as the sum-of-products operations. In addition, it is not necessary to fetch a sum-of-products operation instruction each time during the execution of the sum-of-products operations, making it possible to avoid delays in the execution of the sum-of-products operation instruction.

The information processing circuit may further comprise a circuit for decrementing a number of times that the sum-of-products operation is to be executed, in synchronization with the execution of a sum-of-products operation, where this number is stored in a register comprised within the control circuit; wherein the sum-of-products operation circuit executes sum-of-products operations until the number of executions reaches a given value. This makes it unnecessary to read the number of executions from memory at each execution of the sum-of-products operation, enabling an improvement in processing speed. If an interrupt has occurred during the execution of a plurality of sum-of-products operations, this configuration also makes it possible to resume executing the sum-of-products operations after the interrupt processing, based on the number of executions stored in the register.

The sum-of-products operation instruction may comprise an operand for specifying one register from a group consisting of a register for the number of times the sum-of-products operation is to be executed, a register for first sum-of-products input data, and a register for second sum-of-products input data; and the control circuit may specify a register other than that one register, in accordance with a given rule based on the operand that specifies that one register. This makes it possible to reduce the instruction bit length and thus make the program code more compact.

The sum-of-products operation instruction may comprise an operand for specifying a register for the number of times the sum-of-products operation is to be executed, an operand for specifying a register for first sum-of-products input data, and an operand for specifying a register for second sum-of-products input data. In addition, the control circuit may comprise at least one of a dedicated register for the number of times the sum-of-products operation is to be executed, a dedicated register for first sum-of-products input data, and a dedicated register for second sum-of-products input data; and the sum-of-products operation instruction may comprise an operation code which uses that at least one dedicated register as an implicit operand.

When an interrupt request has occurred during the execution of the number of sum-of-products operations as specified by the number-of-executions information, the control circuit receives the interrupt request and resumes the execution of the thus-halted sum-of-products operations after interrupt processing has ended. This removes the problem of the long wait time for an interrupt, if it should occur during the execution of a plurality of sum-of-products operations.

When an interrupt request has occurred, the control circuit temporarily ends the sum-of-products operations without incrementing a program counter comprised within the control circuit; and, after the end of interrupt processing, the control circuit resumes the execution of the sum-of-products operations, based on the contents at the interrupt processing branch point of registers for the number of times the sum-of-products operation is to be executed, first sum-of-products input data, and second sum-of-products input data. This makes it possible to resume the execution of the sum-of-products operations for a suitable number of executions, using suitable first and second sum-of-products input data, after the end of interrupt processing.

The information processing circuit may further comprise a state machine that returns the sum-of-products operation circuit to an initial state, based on a signal that goes active either when sum-of-products operations have been executed a number of times specified by the number-of-executions information or when the interrupt request has occurred. This simplifies the configuration of the state machine.

The information processing circuit may further comprise a state machine that returns the sum-of-products operation circuit to an initial state, after changing the contents of registers for first sum-of-products input data and second sum-of-products input data to contents to be used when the resumption of execution of the sum-of-products operations. This makes it possible to resume the execution of sum-of-products operations after the end of interrupt processing, using suitable first and second sum-of-products input data.

The control circuit may controls the reading of first and second sum-of-products input data by a single memory access from adjacent areas in memory at which the first and second sum-of-products input data are stored. Up until now, the time taken to execute one sum-of-products operation has been limited by the time required for two memory accesses, but the present invention makes it possible to shorten this execution time to the time required for a single memory access.

When data transfer between the control circuit and the memory is over a $2^n$-bit bus, the upper $2^{n-1}$ bits of the thus-transferred data may be handled as the first sum-of-products input data and the lower $2^{n-1}$ bits thereof may be handled as the second sum-of-products input data. This makes it possible to use a $2^n$-bit bus to read the first and second sum-of-products input data by a single memory access.

The sum-of-products operation circuit may multiply first and second sum-of-products input data in a first stage of a pipeline process; add the result of the first-stage multiplication to data stored in a given register for a first sum-of-products result, in a second stage of the pipeline process; and increment or decrement data that is stored in a given register for a second sum-of-products result, in a third stage of the pipeline process, when either a carry or a borrow is generated by the second-stage addition. This makes it possible to solve the critical path and overflow problems that occur when the multiplication result is added.

The sum-of-products operation circuit may comprise: the registers for the first and second sum-of-products results; a multiplier for multiplying the first and second sum-of-products input data; an adder for adding the result of the multiplication of the multiplier to data stored in the register for the first sum-of-products result; and a circuit for incrementing or decrementing data stored in the register for the second sum-of-products result, based on a carry signal or a borrow signal from the adder.

Each of the first and second sum-of-products input data may be $2^{n-1}$-bit data and each of the registers for the first and second sum-of-products results may be a $2^n$-bit register. This makes it, possible to add the result of the sum-of-products operation to a $2^{n+1}$-bit register which consists of a $2^n$-bit register for the first sum-of-products result and a $2^n$-bit register for the second sum-of-products result, thus making it possible to execute the sum-of-products operation a number of times that is effectively limitless.

A second aspect of this invention concerns a microcomputer integrated onto a semiconductor substrate, which comprises any one of the above described information processing circuits and at least one component from the group of a bus control circuit, memory, interrupt controller, timer circuit, analog interface circuit, data transfer control circuit, and I/O circuit. Use of such a microcomputer makes it possible to replace the DSP, image-processing IC, or sound-processing IC that has had to be used up until now for such processing.

According to a third aspect of this invention, there is provided electronic equipment comprising the above described microcomputer, an input source for data to be processed by the microcomputer, and an output device for outputting data that has been processed by the microcomputer. This makes it possible to replace a DSP or the like with this microcomputer for image or sound processing, which makes such electronic equipment less expensive, more compact, and more power efficient.

BRIEF DESCRIPTION OF DRAWINGS

FIG. 6A, FIG. 6B, FIG. 6C are diagrams illustrating various embodiments of the sum-of-products operation instruction.

DETAILED DESCRIPTION OF PREFERRED EMBODIMENTS

Preferred embodiments of this invention are described below with reference to the accompanying drawings. Note that description below mainly concerns examples in which an information processing circuit in accordance with this invention is applied to a microcomputer.

Embodiment 1

A first embodiment of this invention executes a sum-of-products operation in a sum-of-products operation circuit, for a number of times that is specified on the basis of number-of-executions information comprised within the sum-of-products operation instruction.

Figure 1:
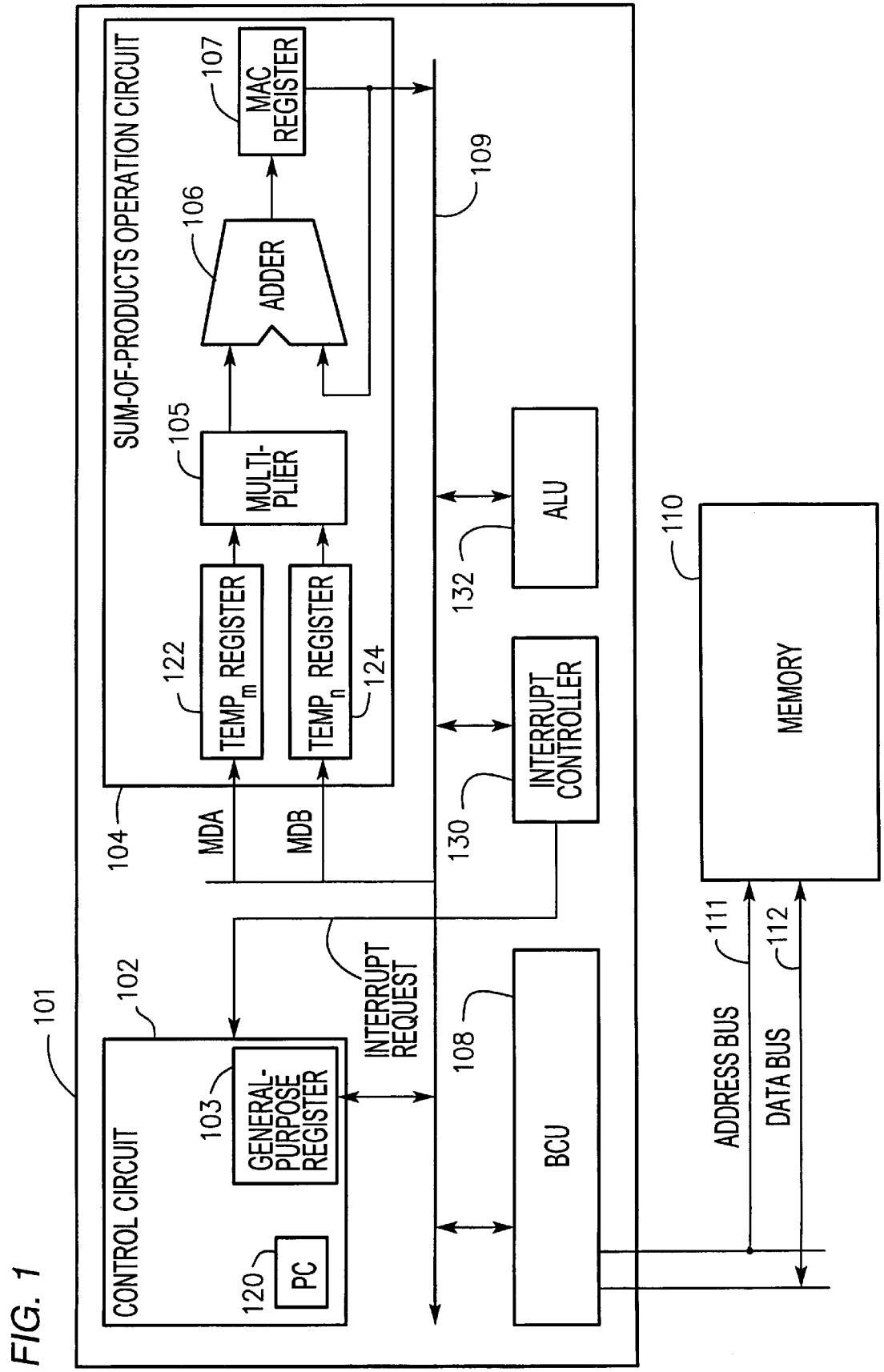
FIG. 1 is a block diagram of a configurational example of a microcomputer.

A block diagram of a microcomputer 101 that has an internal sum-of-products operation circuit 104 is shown in FIG. 1. This function block diagram is common to Embodiment 1 and Embodiments 2, 3, and 4 which will be described later. The microcomputer 101 in FIG. 1 processes 32-bit data. The sum-of-products operation circuit 104 multiplies first and second sum-of-products input data MDA and MDB, each of 16 bits, and adds the 32-bit data that is the result of this multiplication to a 64-bit MAC register 107. Note, however, that the applicable range of this invention is not limited by the bit length of the data processed by the microcomputer and sum-of-products operation circuit, nor by factors such as the number of general-purpose registers incorporated into the microcomputer.

The microcomputer 101 of FIG. 1 comprises a control circuit 102 for the processing of 32-bit data; a bus control unit (BCU) 108 for controlling a bus that connects the microcomputer 101 to a memory 110; the sum-of-products operation circuit 104 that executes sum-of-products operations; an interrupt controller 130 that receives various interrupts from inside and outside the microcomputer and sends interrupt requests to the control circuit 102; and an arithmetic and logic unit (ALU) 132 that performs arithmetical operations on data, such as addition or subtraction, and also performs logical operations such as ANDs, ORs, and logical shifts.

In this case, the control circuit 102 receives instructions that comprise a sum-of-products operation instruction, analyzes the thus-received instructions, and controls the execution of the analyzed instructions, and it uses 16-bit instructions. The control circuit 102 comprises a general-purpose register 103, which consists of sixteen 32-bit registers R0 to R15, and a program counter (PC) 120. Under the control of the control circuit 102, the sum-of-products operation circuit 104 executes sum-of-products operations and the ALU 132 executes arithmetic and logical operations. The control circuit 102, the sum-of-products operation circuit 104, and the ALU 132 together function as a central processing unit (CPU).

The control circuit 102, the BCU 108, and the sum-of-products operation circuit 104 transfer data over an internal data bus 109. The BCU 108 uses an external address bus 111 and an external data bus 112 and reads first and second sum-of-products input data MDA and MDB out from the memory 110. It should be noted, however, that the applicable range of this invention is not related to whether the memory 110 is incorporated within the memory 110 or provided outside of the microcomputer 101.

The sum-of-products operation circuit 104 comprises a TEMPm register 122 and a TEMPn register 124 for temporarily holding the first and second sum-of-products input data MDA and MDB, a multiplier 105 for multiplying the temporarily held data MDA and MDB, an adder 106 for executing an add with the result of this multiplication, and the 64-bit MAC register (a register for the sum-of-products result) 107 for holding the result of this add. The sum-of-products operation circuit 104 receives the 16-bit data MDA and MDB, adds the result of the multiplication thereof and the contents of the MAC register 107, then stores the result of that add into the MAC register 107.

The operation of this embodiment will now be described with reference to the flow chart of FIG. 2 and the memory maps of FIGS. 3A, 3B, and 3C.

Figure 3:
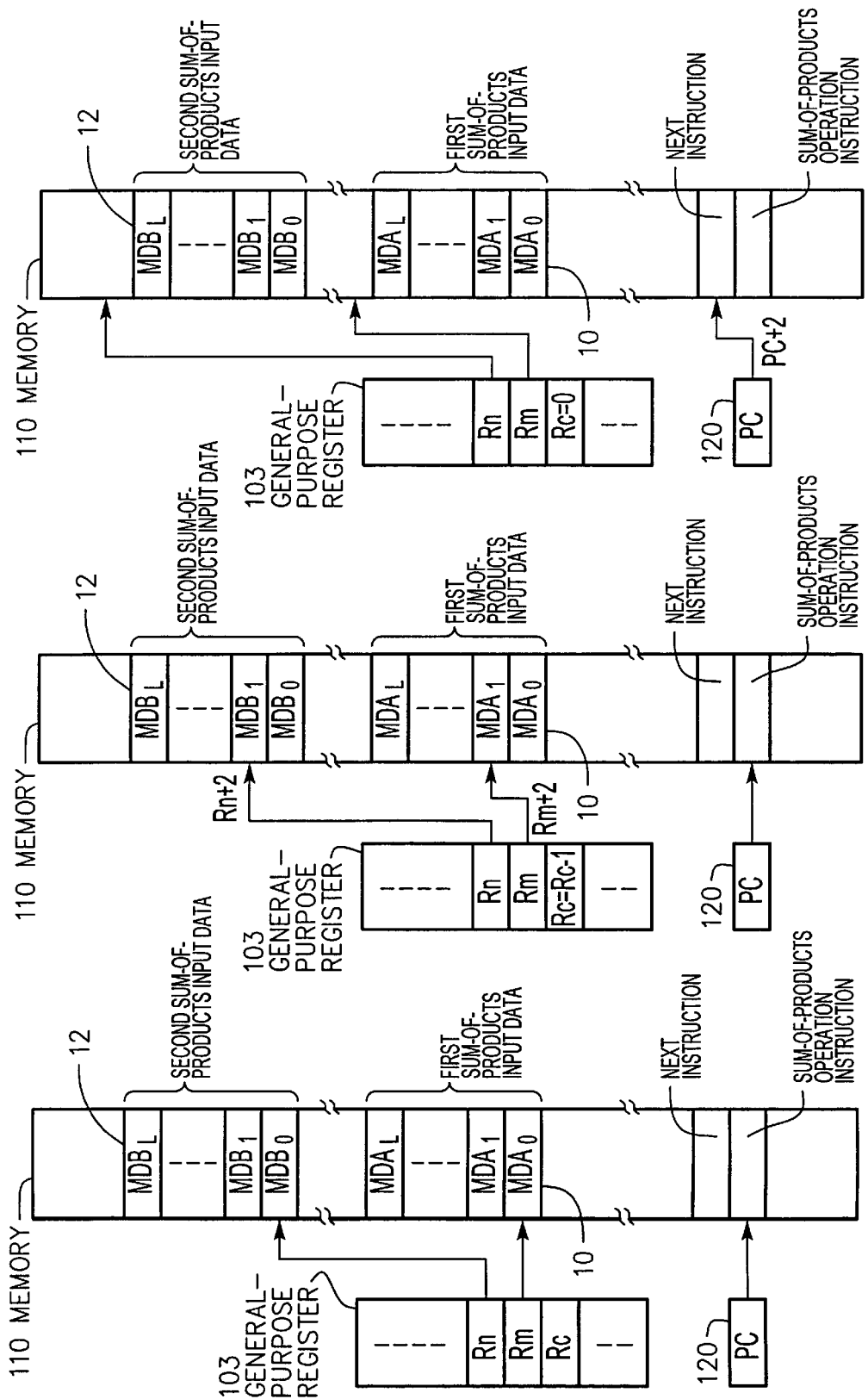
FIGS. 3A, 3B, and 3C show the relationships between registers and data stored in memory.

Before the execution of the sum-of-products operation instruction, the first sum-of-products input data $MDA_0$ to $MDA_L$ is stored in a first area 10 in memory and the second sum-of-products input data $MDB_0$ to $MDB_L$ is stored in a second area 12, as shown in FIG. 3A. The start addresses of the first and second areas 10 and 12 are previously loaded into registers Rm and Rn within the general-purpose register 103, so that Rm and Rn point to the start data $MDA_0$ and $MDB_0$ of the first and second sum-of-products input data. The number of times the sum-of-products operation is to be executed is previously loaded into a register Rc within the general-purpose register 103 and also the MAC register 107 is initialized.

If the control circuit 102 receives a sum-of-products operation instruction in this state (in other words, if the instruction that the PC 120 points to is a sum-of-products operation instruction, as shown in FIG. 3A), the various processes required for executing this sum-of-products operation instruction are executed under the control of the control circuit 102 that analyzes this sum-of-products operation instruction.

Figure 2:
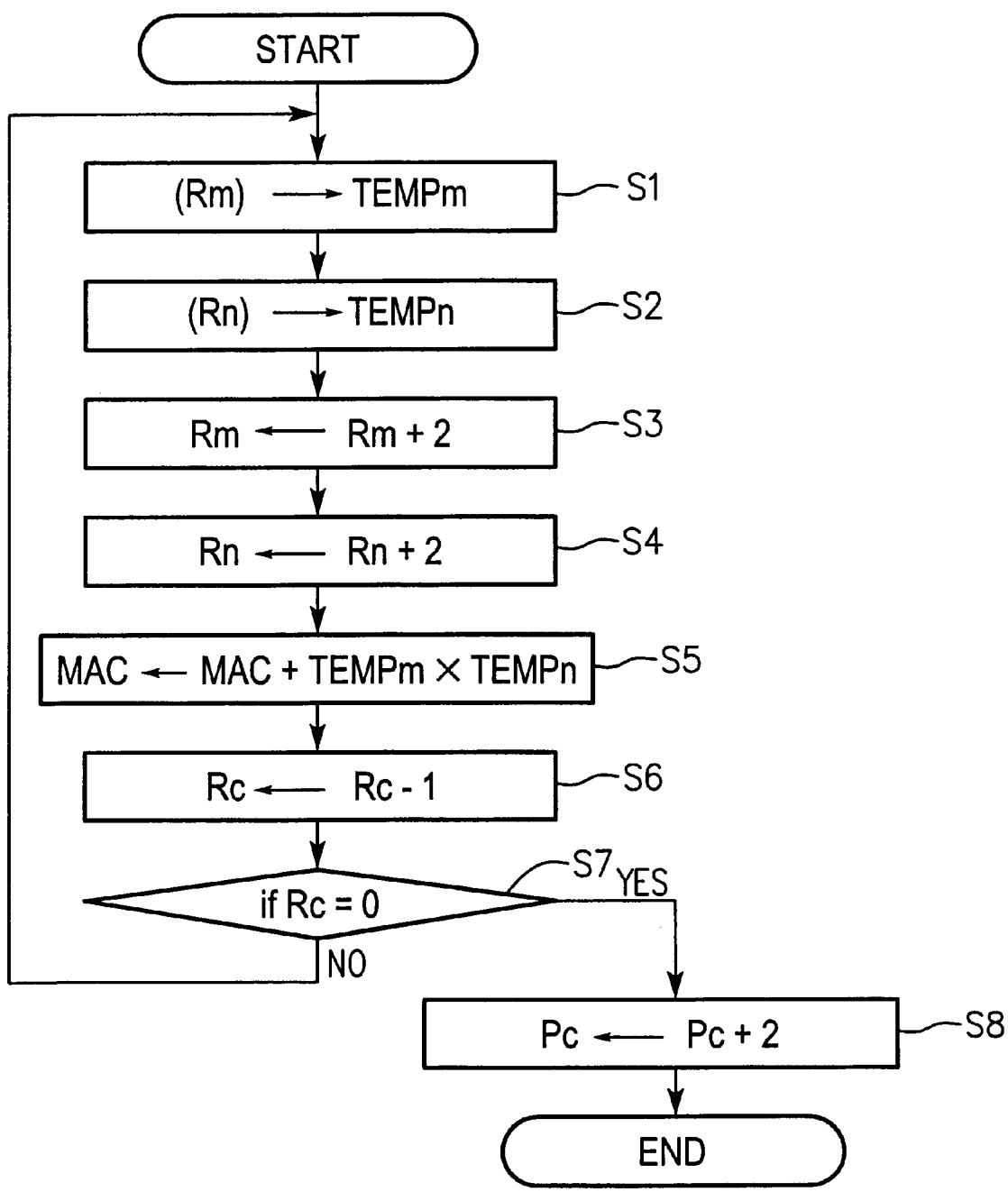
FIG. 2 is a flow chart illustrating the operation of Embodiment 1.

In other words, the first sum-of-products input data $MDA_0$ specified by the address stored in the register Rm is read from the memory 110 through the BCU 108 and is stored in the TEMPm register 122 (step S1 in FIG. 2). Similarly, $MDB_0$ pointed to by Rn is read from the memory 110 through the BCU 108 and is stored in the TEMPn register 124 (step S2). Note that (Rm) and (Rn) referred to in steps S1 and S2 mean the first and second sum-of-products input data in memory specified by the addresses stored in the registers Rm and Rn.

The addresses stored in Rm and Rn are then incremented by 2 (steps S3 and S4). In this embodiment, the memory space is addressed in minimum units of 8-bit bytes and the first and second sum-of-products input data are 16-bit data. Therefore, when the addresses in Rm and Rn are incremented by 2, Rm and Rn are updated to point to the next sum-of-products input data $MDA_1$ and $MDB_1$, as shown in FIG. 3B.

The 16-bit data $MDA_0$ and $MDB_0$ stored in the TEMPm register 122 and the TEMPn register 124 are multiplied by the multiplier 105, the result of this multiplication is added to the contents of the MAC register 107 by the adder 106, and the result of this add is stored in the MAC register 107 (step S5).

The number of times the sum-of-products operation is to be executed, which is stored in the register Rc, is then decremented (step S6). In other words, the number of times the sum-of-products operation is to be executed is decremented in synchronization with the sum-of-products operation. Note that the number of executions is shown in FIG. 2 to be decremented at the end of each sum-of-products operation, but this decrement of the number of executions could at least be done in synchronization with the execution of the sum-of-products operation. This decrement is done by the ALU 132 of FIG. 1, for example.

The microcomputer then determines whether or not the number of times the sum-of-products operation is to be executed, which is stored in Rc, is a given value, such as zero (step S7). If it is not zero, the processing returns to step S1. In this case, the addresses in Rm and Rn have been incremented by 2 as described above, so the operands of the next sum-of-products operation are the next sum-of-products input data $MDA_1$ and $MDB_1$ (see FIG. 3B)

If, on the other hand, the sum-of-products operation has been repeated the number of times that was set in Rc, and thus Rc has reached zero, the address stored in the PC 120 is incremented by 2, as shown in FIG. 3C (step S8). This ensures that the sum-of-products operation instruction ends and also the PC 120 points to the next instruction. Since the instruction length in this embodiment is 16 bits or 2 bytes, if the value (address) in the PC 120 is incremented by 2, the next instruction two bytes onward is indicated.

The control of the control circuit 102 over the components such as the sum-of-products operation circuit 104, the BCU 108, and the ALU 132 to perform the above processing ensures that the sum-of-products operation can be executed a desired number of times by a single instruction.

Figure 4:
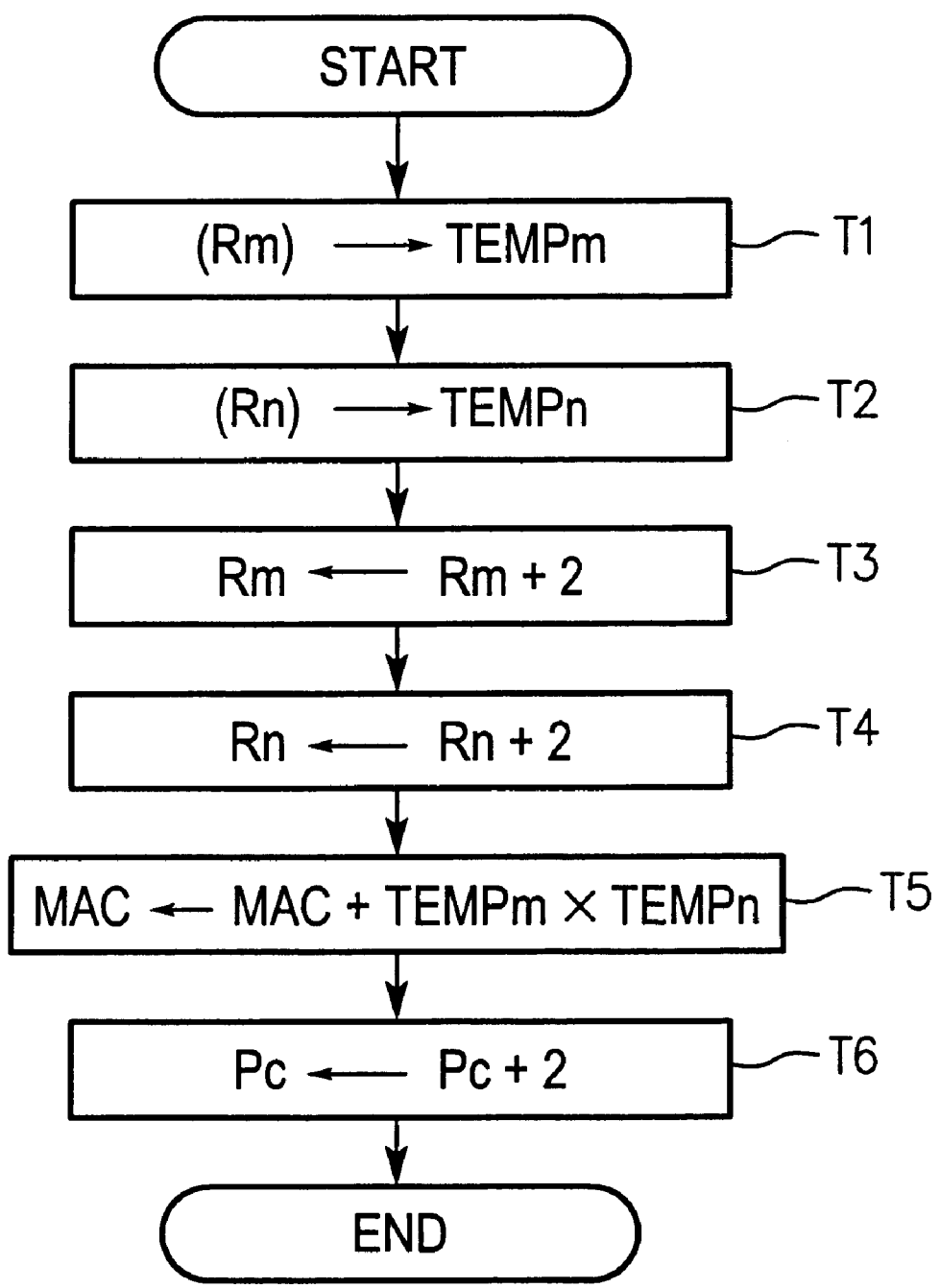
FIG. 4 is a flow chart illustrating the operation of a comparative example.

A flow chart of the processing of a microcomputer that is a comparative example for this embodiment is shown in FIG. 4. Steps T1 to T5 in FIG. 4 are the same as steps S1 to S5 of FIG. 2. However, the comparative example of FIG. 4 differs from the embodiment of FIG. 2 in that it increments the value in the PC 120 by 2 and ends the sum-of-products operation instruction, without decrementing the value in Rc or determining whether or not the value in Rc is zero. In addition, there is no information within the sum-of-products operation instruction for specifying the number of times the sum-of-products operation is to be executed.

Figures 5A, 5B:
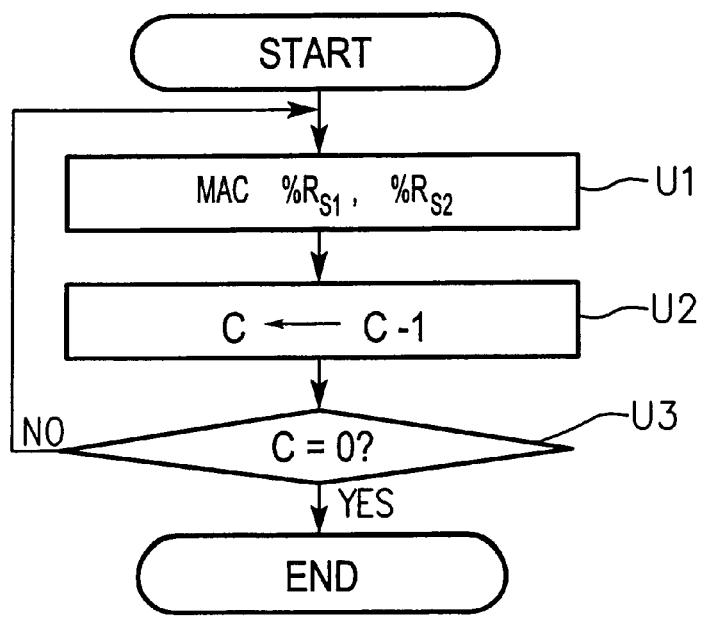
FIGS. 5A and 5B are diagrams illustrating problems with this comparative example.

Therefore, to ensure that the technique of FIG. 4 executes the sum-of-products operation the desired number of times, it is necessary to write the program with the same number of sum-of-products operation instructions as that number of times, as shown in FIG. 5A, which leads to problems in that the size of the program code increases and a larger memory is required for storing these instructions.

One technique for solving these problems is to write a program such that the sum-of-products operation is executed while a number of times C that this sum-of-products operation is to be executed is decremented (steps U1 and U2), and it escapes from this loop when the number of times C reaches zero (step U3). However, if this technique is used, the time required for executing the sum-of-products operation once becomes longer. In other words, in addition to the time required for executing the sum-of-products operation instruction (step U1), this technique necessitates the time required for executing an instruction that decrements the number of times C (step U2) and the time required for determining whether or not the number of executions has reached zero (step U3). This means that the processing time is at least two clock periods longer than that of the embodiment of FIG. 2, which leads to a drop in processing speed.

In contrast thereto, it is not necessary with this embodiment to write a program that has a sequence of the same number of sum-of-products operation instructions as the number of executions. And it is not necessary to write a program that decrements the number of executions and determines whether or not that number is zero. This makes it possible to execute sum-of-products operation a desired number of times by a single sum-of-products operation instruction, while enabling more efficient use of the code size, a reduction in the size of memory for storing the instructions, and an increase in processing speed.

With this embodiment, it is not necessary to fetch a sum-of-products operation instruction each time during the execution of the sum-of-products operation. This prevents delays in the execution of the sum-of-products operation instruction caused by conflict between the reading out of sum-of-products input data and the fetch of the sum-of-products operation instruction, and also enables a reduction in power consumption caused by wasteful fetches.

It is possible to conceive of various other embodiments of a sum-of-products operation instruction containing a specification of the number of times the sum-of-products operation is to be executed.

For example, the sum-of-products operation instruction could comprise a 6-bit length of operation code for specifying the sum-of-products operation instruction from within a plurality of instructions and a 4-bit operand specifying the register Rc from among the sixteen general-purpose registers, as shown in FIG. 6A. In such a case, the control circuit 102 specifies the register Rm for the first sum-of-products input data and the register Rn for the second sum-of-products input data, in accordance with a given rule that is based on this operand that specifies Rc. If, for example, the general-purpose register R13 is allocated by the sum-of-products operation instruction of FIG. 6A as Rc, the processing increments R13 by +1 and +2 to allocate the general-purpose registers R14 and R15 as Rm and Rn. This makes it possible to restrict the instruction length to within 16 bits, enabling efficient use of the code size and reducing the size of memory required for storing the instructions. The technique of FIG. 6A is particularly effective in an instruction set architecture in which all of the instructions are of a fixed length, such as 16 bits, to ensure that the code size is used efficiently. Note that the sum-of-products operation instruction of FIG. 6A comprises an operand that specifies Rc, but it can equally well comprise an operand that specifies Rm or Rn.

The sum-of-products operation instruction shown in FIG. 6B comprises a 6-bit length of operation code, a 4-bit operand that specifies Rc, a 4-bit operand that specifies Rm, and a 4-bit operand that specifies Rn. In other words, Rc, Rm, and Rn are directly specified by the sum-of-products operation instruction. In comparison with the technique of FIG. 6A, this has a disadvantage in that the instruction length is longer, but it has an advantage in that there is no need of processing for specifying others operand from one operand.

In the technique shown in FIG. 6C, Rc, Rm, and Rn are set to be dedicated registers for the number of executions and the first and second sum-of-products input data, respectively. In this case, the sum-of-products operation instruction comprises an operation code that uses these dedicated registers as implicit operands. This enables efficient use of the code size. Note that, although all of Rc, Rm, and Rn are shown in FIG. 6C as being dedicated registers, the configuration could be such that only one or two of them are dedicated registers.

Note also that, in this embodiment, although the first and second sum-of-products input data are read from memory at each execution of the sum-of-products operation, based on addresses stored in the registers Rm and Rn, the value stored in Rc is used as the number of executions. It is because reading the number of executions from memory at each execution of the sum-of-products operation would lead to a drop in the processing speed. After the number of executions has been loaded from memory into the register Rc in this embodiment, it is decremented by the ALU 132, so it is not necessary to read the number of executions again from memory, unlike with the sum-of-products input data. It should be noted, however, that the range of this invention is not limited to this technique of specifying the number of executions.

Embodiment 2

A second embodiment of this invention receives an interrupt during the execution of a plurality of sum-of-products operations and also resumes the execution of the halted sum-of-products operations after the interrupt has ended. Embodiment 2 is described below with reference to the flow chart of FIG. 7 and the memory maps of FIGS. 8A and 8B.

With the previously described Embodiment 1, a plurality of sum-of-products operations can be executed by a single sum-of-products operation instruction. However, since the execution of this plurality of sum-of-products operations is viewed as that of one instruction, the value in the PC 120 changes only when the same number of sum-of-products operations as the number of executions set in the Rc has been completed, so the processing does not move onto the next instruction. An interrupt request from the interrupt controller 130 of FIG. 1 is ordinarily processed at the boundary between one instruction and another instruction. It therefore takes a long time for a transition to interrupt processing if it should occur during the execution of a plurality of sum-of-products operations.

Figure 7:
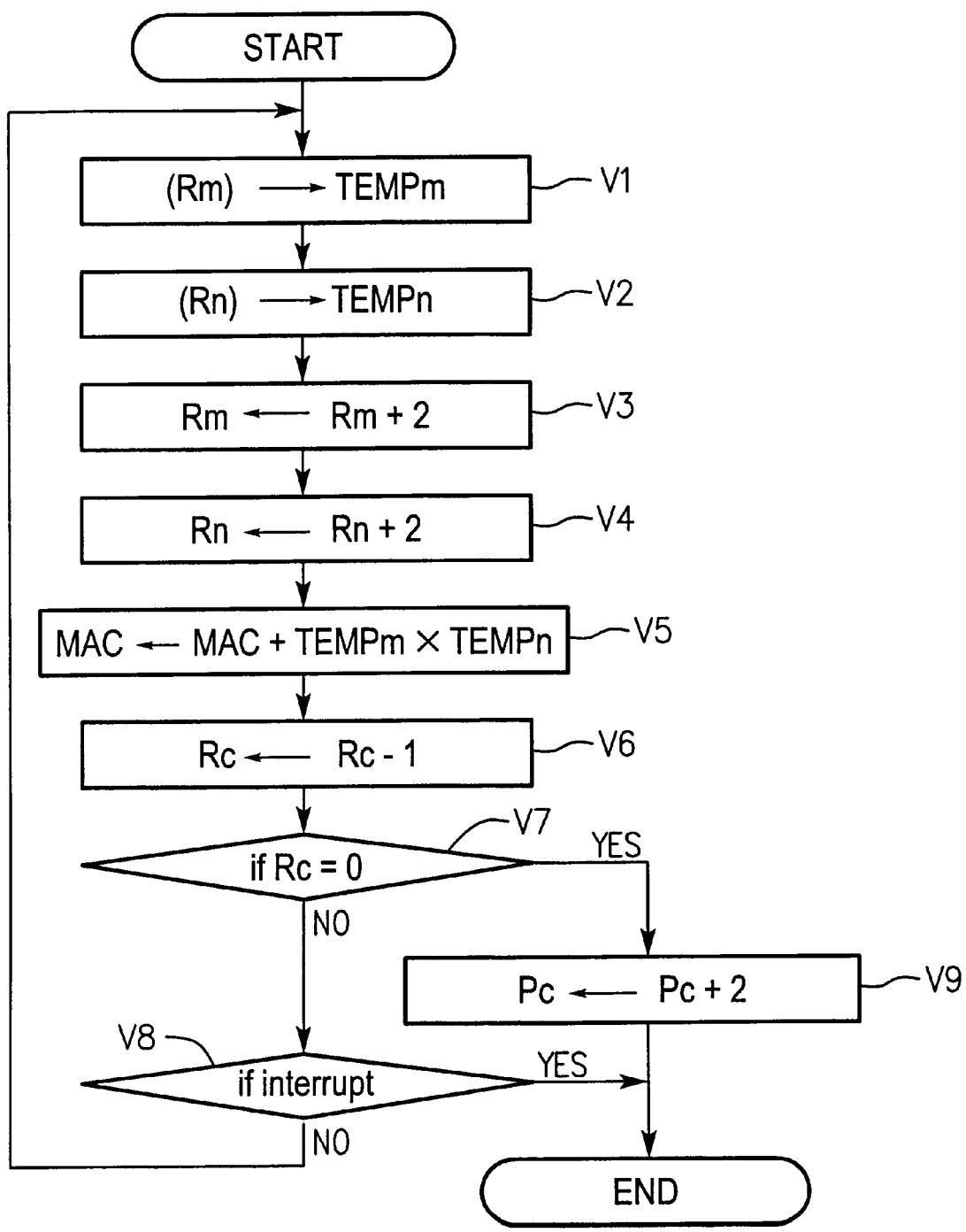
FIG. 7 is a flow chart illustrating the operation of Embodiment 2.

That is why Embodiment 2 performs the processing shown in FIG. 7 (note that steps V1 to V6 of FIG. 7 are the same as steps S1 to S6 of FIG. 2). In other words, after the determination as to whether or not the number of times the sum-of-products operation is to be executed, which is the value in Rc, is zero (step V7), the microcomputer determines whether or not there is an interrupt request (step V8). If there is no interrupt request, the processing of the sum-of-products operations continues and the sum-of-products operation is performed on the basis of the next sum-of-products input data. If there is an interrupt request, on the other hand, the sum-of-products operation instruction is temporarily ended without the PC 120 being incremented (the processing of step V9 is omitted). Assume that an interrupt request is generated during the sum-of-products operation processing of sum-of-products input data $MDA_{K-1}$ and $MDB_{K-1}$ in FIG. 8A, for example. In this case, the processing of steps V3 and V4 of FIG. 7 has set Rm and Rn to point to the next sum-of-products input data $MDA_K$ and $MDB_K$. The PC 120 is still pointing to this sum-of-products operation instruction, not the next instruction (see H1 in FIG. 8A).

The end of the sum-of-products operation instruction enables a branch to an interrupt processing sub-program and thus the execution of interrupt processing. Such interrupt processing ordinarily occurs at the boundary between two instructions. Before branching to the interrupt processing, the interrupt processing handler in this case stacks the value in the PC 120, which points to the return address for after the interrupt processing has ended. When the flow branches to interrupt processing during the execution of the sum-of-products operation instruction with this embodiment, however, the sum-of-products operation instruction ends without incrementing the PC 120 by 2, as shown in steps V8 and V9 in FIG. 7. Therefore, the PC 120 still points to the sum-of-products operation instruction, as shown by H2 in FIG. 8B, so that the same sum-of-products operation instruction can be executed again after the interrupt processing ends.

Figure 8:
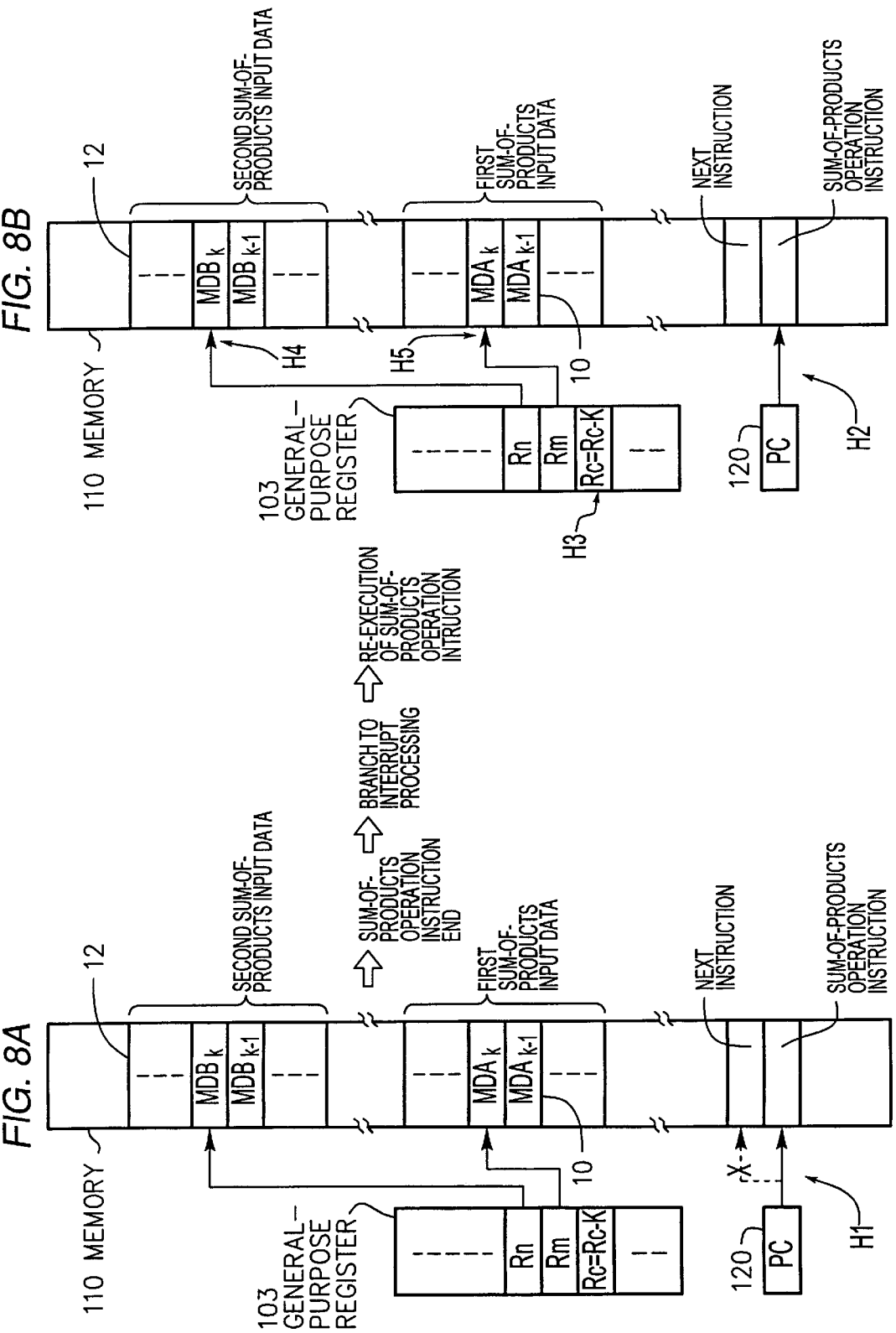
FIGS. 8A and 8B show the relationships between registers and data stored in memory.

At this time, the values in Rc, Rm, and Rn are the same as those at the branch to the interrupt processing, as shown by H3, H4, and H5 in FIG. 8B. This makes it possible to resume properly the execution of the sum-of-products operation that was halted by the interrupt processing, In other words, before it is halted by the interrupt, the processing is completed up to the manipulation of the sum-of-products input data $MDA_{K-1}$ and $MDB_{K-2}$. After the halt, the execution of the sum-of-products operation can resume from the processing with respect to $MDA_K$ and $MDB_K$.

The above described Embodiment 2 makes it possible to receive an interrupt during the execution of a plurality of sum-of-products operations and perform interrupt processing. Moreover, it makes it possible to make the waiting time for interrupt processing the same as that in the embodiment of FIG. 4.

Embodiment 3

Figure 9:
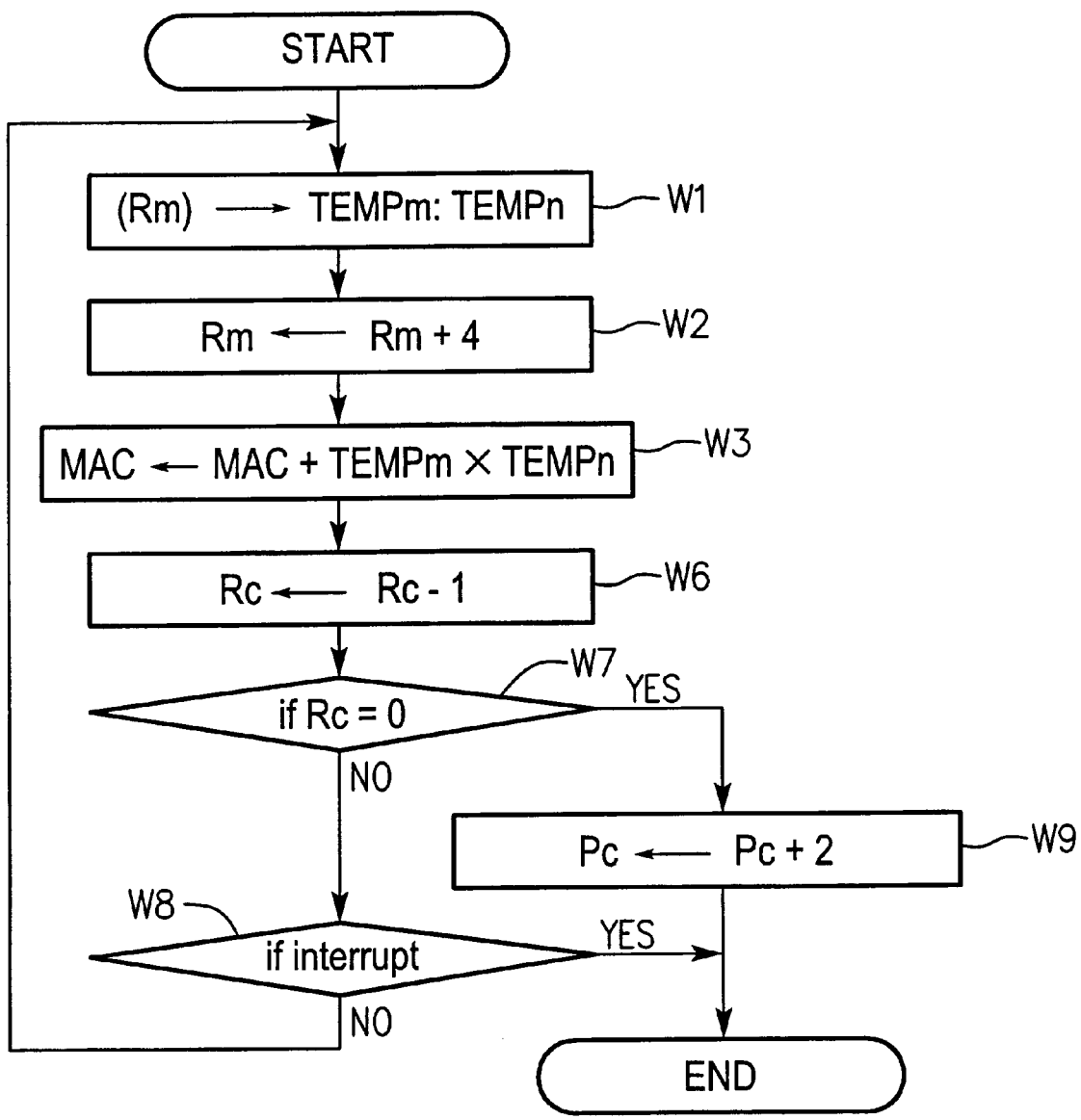
FIG. 9 is a flow chart illustrating the operation of Embodiment 3.

A third embodiment of this invention makes it possible to read out first and second sum-of-products input data by a single memory access, from adjoining areas in memory at which these first and second sum-of-products input data are stored. The operation of Embodiment 3 will now be described with reference to the flow chart of FIG. 9 and the memory maps of FIGS. 10A, 10B, and 10C.

Figure 10A:
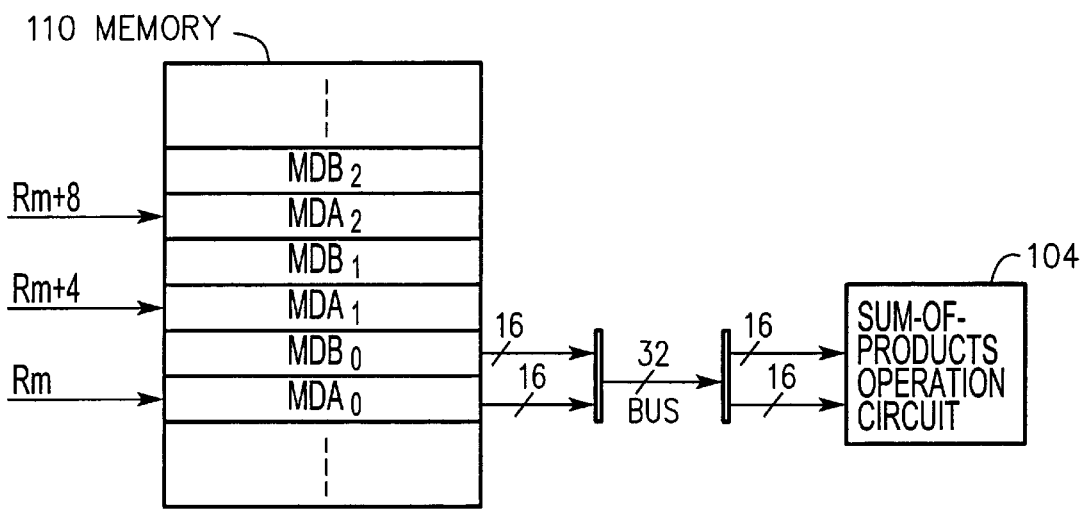
FIG. 10A is a diagram illustrating the technique used by Embodiment 3 for storing data in memory.

With Embodiment 3, first sum-of-products input data MDA and second sum-of-products input data MDB are stored at adjacent locations in memory, as shown in FIG. 10A. For example, data $MDB_0$ is stored after data $MDA_1$, and $MDA_1$ and $MDB_1$ are stored after $MDB_0$. In other words, if N represents natural numbers, the first sum-of-products input data MDA is stored at addresses 4N and the second sum-of-products input data MDB is stored at addresses 4N+2. This point is different from the configuration shown in FIGS. 3A to 3C in which the first sum-of-products input data MDA is stored together in the first area 10 and the second sum-of-products input data MDB is stored together in the second area 12.

Embodiment 3 also differs from Embodiments 1 and 2 in that it uses two registers Rm and Rc instead of three. In other words, the configuration is such that $MDA_0$ and $MDB_0$ are read out in accordance with Rm, then $MDA_1$ and $MDB_1$ are read out in accordance with a value that is the value of Rm plus 4.

The operation of Embodiment 3 will now be described. First of all, the first and second sum-of-products input data $MDA_0$ and $MDB_0$ are read out from memory as specified by the address stored in the register Rm. The upper 16 bits (2 bytes) of the read-out data are stored in the TEMPm register 122 and the lower 16 bits thereof are stored in the TEMPn register 124 (step W1).

In other words, data transfer between the memory 110 and the sum-of-products operation circuit 104 in this embodiment is over a 32-bit bus, as shown in FIG. 10A. This means that 32 bits (4 bytes) of data can be read by a single memory access, where the upper 16 bits of the read-out data becomes the first sum-of-products input data $MDA_0$ and the lower 16 bits thereof becomes the second sum-of-products input data $MDB_0$.

After reading the sum-of-products input data, the microcomputer increments the value in Rm by 4 and executes the sum-of-products operation (steps W2 and W3). Incrementing the value of Rm by 4 makes it possible to specify the next sum-of-products input data $MDA_1$ and $MDB_1$, as shown in FIG. 10A. Note that the processing of steps W6 to W9 is the same as that of steps V6 to V9 of FIG. 7.

Figure 10B:
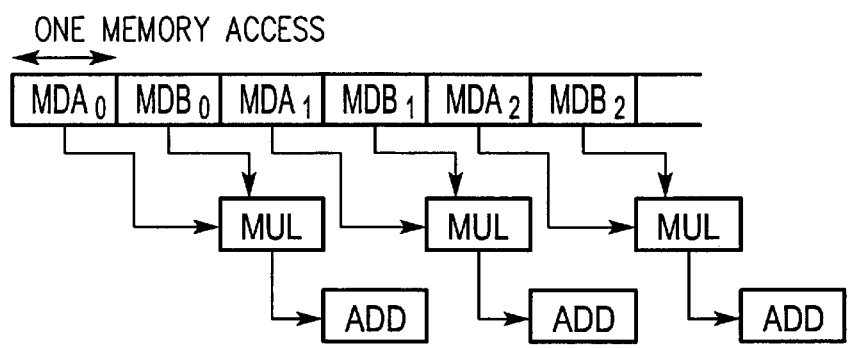
FIG. 10B is an example of a timing chart of a comparative example.

In Embodiments 1 and 2, only one of the first and second sum-of-products input data MDA and MDB is read for each memory access (one clock period), as shown in FIG. 10B. Since the sum-of-products operation cannot be executed until both MDA and MDB are present, in effect the sum-of-products operation can only be executed in two clock cycles. In other words, the time required for executing a single sum-of-products operation is the time taken for two memory accesses.

Figure 10C:
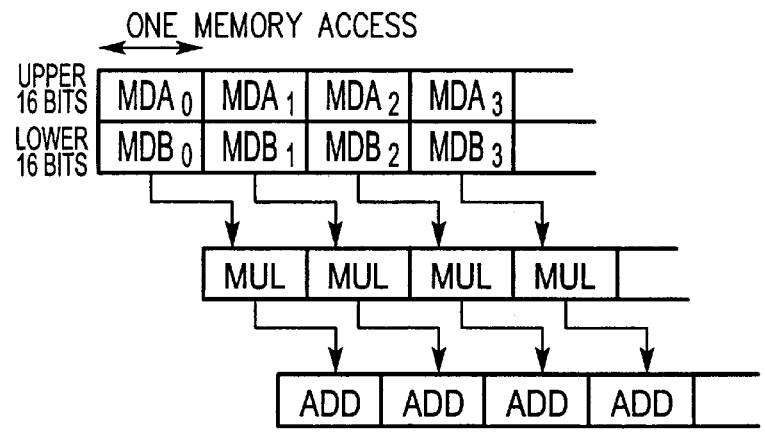
FIG. 10C is an example of a timing chart for Embodiment 3.

In contrast thereto, Embodiment 3 makes it possible to read both of the first and second sum-of-products input data MDA and MDB by a single memory access, as shown in FIG. 10C. Therefore a sum-of-products operation can be performed in each clock period, and thus the time required for executing the sum-of-products operation can be made to be the time taken by a single memory access. This enables a dramatic improvement in processing speed.

Embodiment 4

A fourth embodiment of this invention relates to a sum-of-products operation that uses a pipeline method, wherein multiplication is performed in a first stage, addition of the multiplication result to a lower register for a first sum-of-products result is performed in a second stage, and, if the register for the first sum-of-products result overflows, an increment or decrement of a upper register for the second sum-of-products result is performed in a third stage.

Figure 11A:
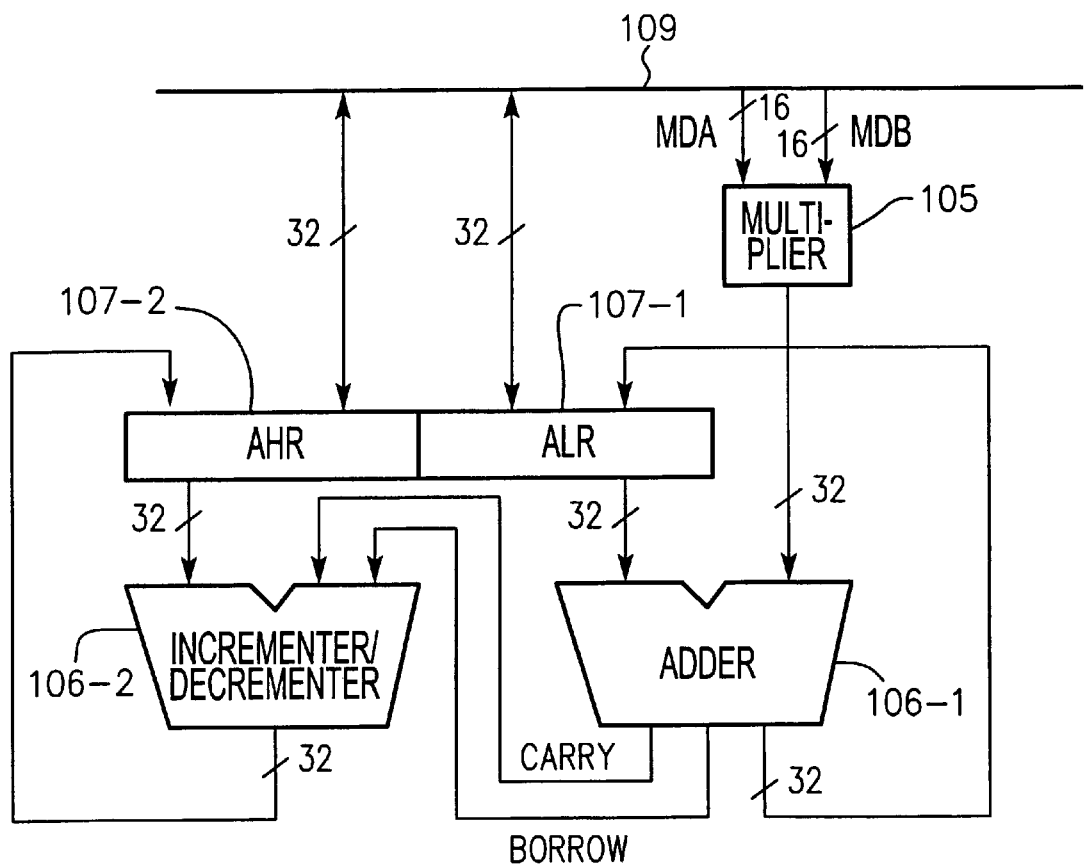
FIG. 11A is a block diagram of a configurational example of Embodiment 4 and FIG. 11B is an example of a timing chart thereof.

A block diagram of a sum-of-products operation circuit in accordance with Embodiment 4 is shown in FIG. 11A. This sum-of-products operation circuit comprises a multiplier 105, an adder 106-1, an incrementer/decrementer 106-2, an ALR 107-1 that is a lower register of a MAC register (a register for the sum-of-products result), and an AHR 107-2 that is an upper register of the MAC register.

Figure 11B:
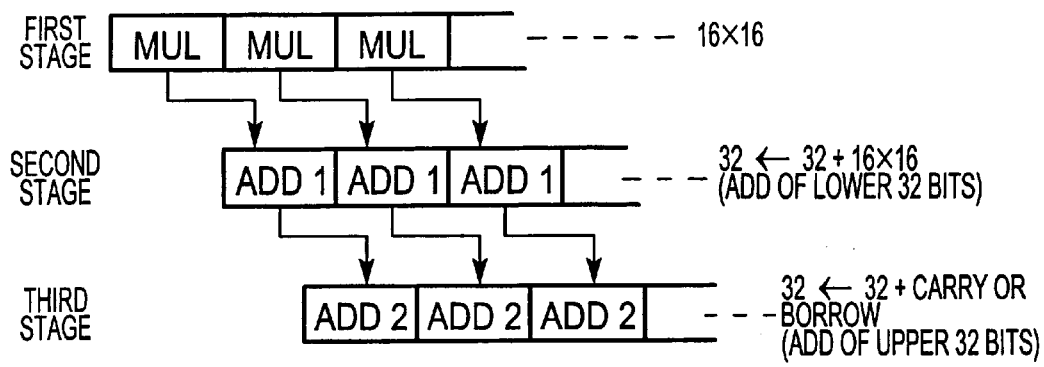

In a first stage of the pipeline process shown in FIG. 11B, the multiplier 105 multiplies first and second sum-of-products input data MDA and MDB. In a second stage of the pipeline process, the adder 106-1 then adds the result of the multiplication of the first stage to data that is stored in the ALR 107-1 (register for the first sum-of-products result). If the add of the second stage causes a positive overflow and thus a carry signal becomes active, the incrementer/decrementer 106-2 in the third stage of the pipeline process increments the data stored in the AHR 107-2 (register for the second sum-of-products result). On the other hand, if the add of the second stage causes a negative overflow and thus a borrow signal becomes active, the incrementer/decrementer 106-2 of the third stage decrements the data stored in the AHR 107-2.

In the thus configured Embodiment 4, the result obtained by multiplying 16-bit data by 16-bit data is added to the 64-bit MAC register formed of the ALR 107-1 and the AHR 107-2. This add is divided into a lower 32-bit add and an upper 32-bit add, with the lower 32-bit add being executed in the second stage of the pipeline process and the upper 32-bit add (increment or decrement) being executed in the third stage of the pipeline process. This makes it possible to achieve the following effects:

(1) The adder 106-1 can be made a 32-bit component, not a 48-bit one, so the problems with the critical path which would occur if a 48-bit adder were used can be solved.

(2) The number of bits of the MAC register (the ALR 107-1 and the AHR 107-2) can be increased to 64 bits, which makes it possible to reduce the possibility of overflow (saturation) during the sum-of-products operation and also makes it possible to increase the number of times the sum-of-products operation is to be executed to $2^{32}-1$, which effectively enables limitless operation. Embodiment 4 is particularly effective when combined with Embodiment 1. In other words, the technique of Embodiment 1, by which information specifying the number of executions is comprised within the sum-of-products operation instruction, ensures that it is not necessary to write a program that has a sequence of the same number of sum-of-products operation instructions as the number of executions, which makes it possible for the user to specify an extremely large number of times that the sum-of-products operation is to be executed. With Embodiment 4, the number of executions of the sum-of-products operation is effectively limitless, so it can cope with a specification of such a large number of executions.

(3) With Embodiment 4, it can be possible to perform an upper 32-bit add by using the incrementer/decrementer 106-2 which is smaller than an ordinary adder from the hardware point of view. This means that it possible to reduce the size of the hardware to a minimum, in spite of the increase in size of the MAC register (the ALR 107-1 and the AHR 107-2 ) to 64 bits.

Note that it is preferable to make the multiplier 105 have a 17-bit×17-bit configuration, to ensure that a single hardware component can be used for handling the multiplications of both signed and unsigned data. The carry signal of FIG. 11A becomes active when a carry is generated by the adder 106-1 and also the data at that time is positive. Conversely, the borrow signal becomes active when a carry is generated by the adder 106-1 but the data at that time is negative. When only unsigned data is to be handled, the borrow signal is not necessary and thus the incrementer/decrementer 106-2 need only have an incrementer function.

Embodiment 5

A fifth embodiment of this invention relates to detailed examples of the control circuit 102, the sum-of-products operation circuit 104, and the ALU 132 shown in FIG. 1. A block diagram thereof is shown in FIG. 12.

Figure 12A:
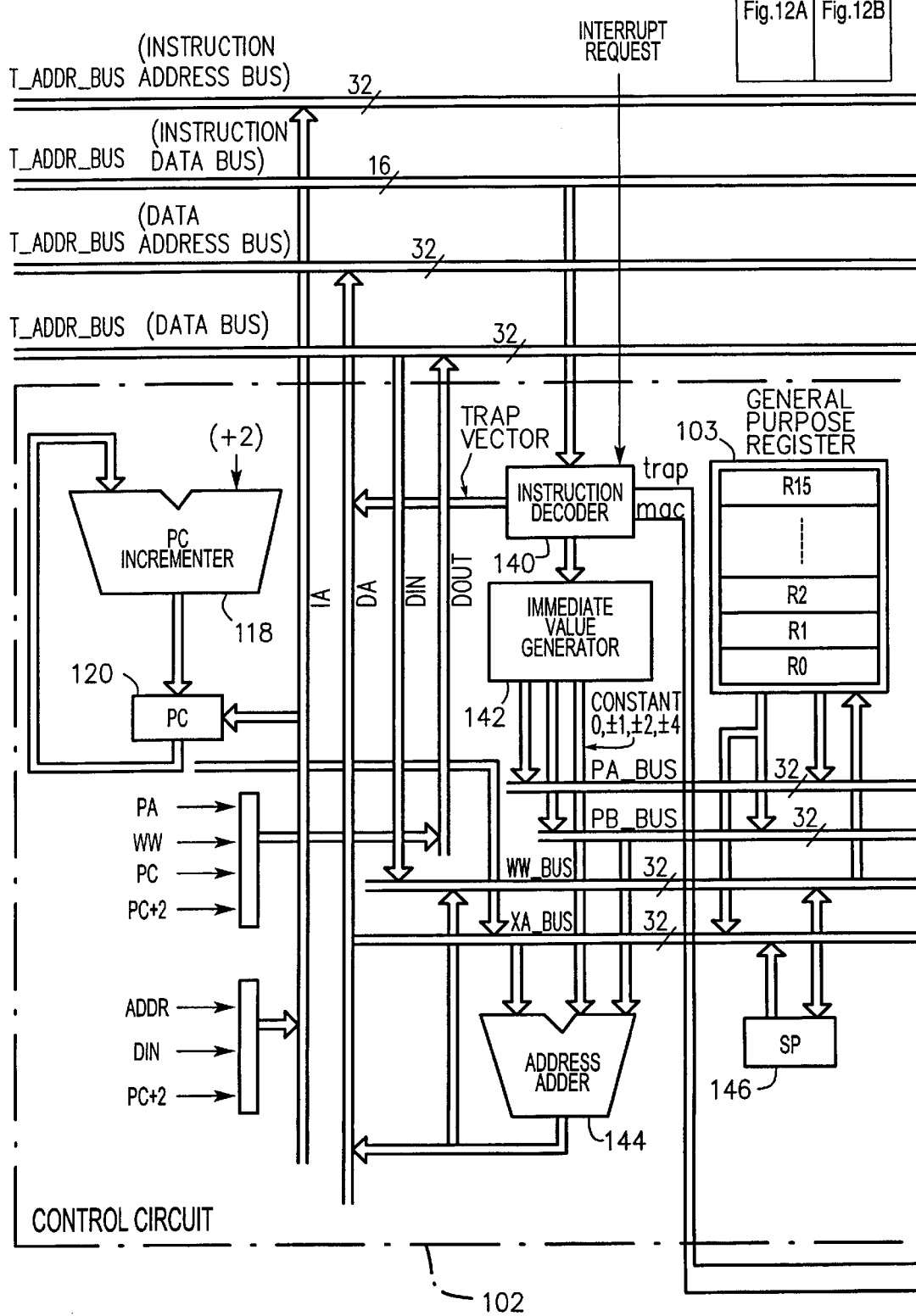
FIG. 12 is a block diagram of a configurational example of Embodiment 5.
Figure 12B:
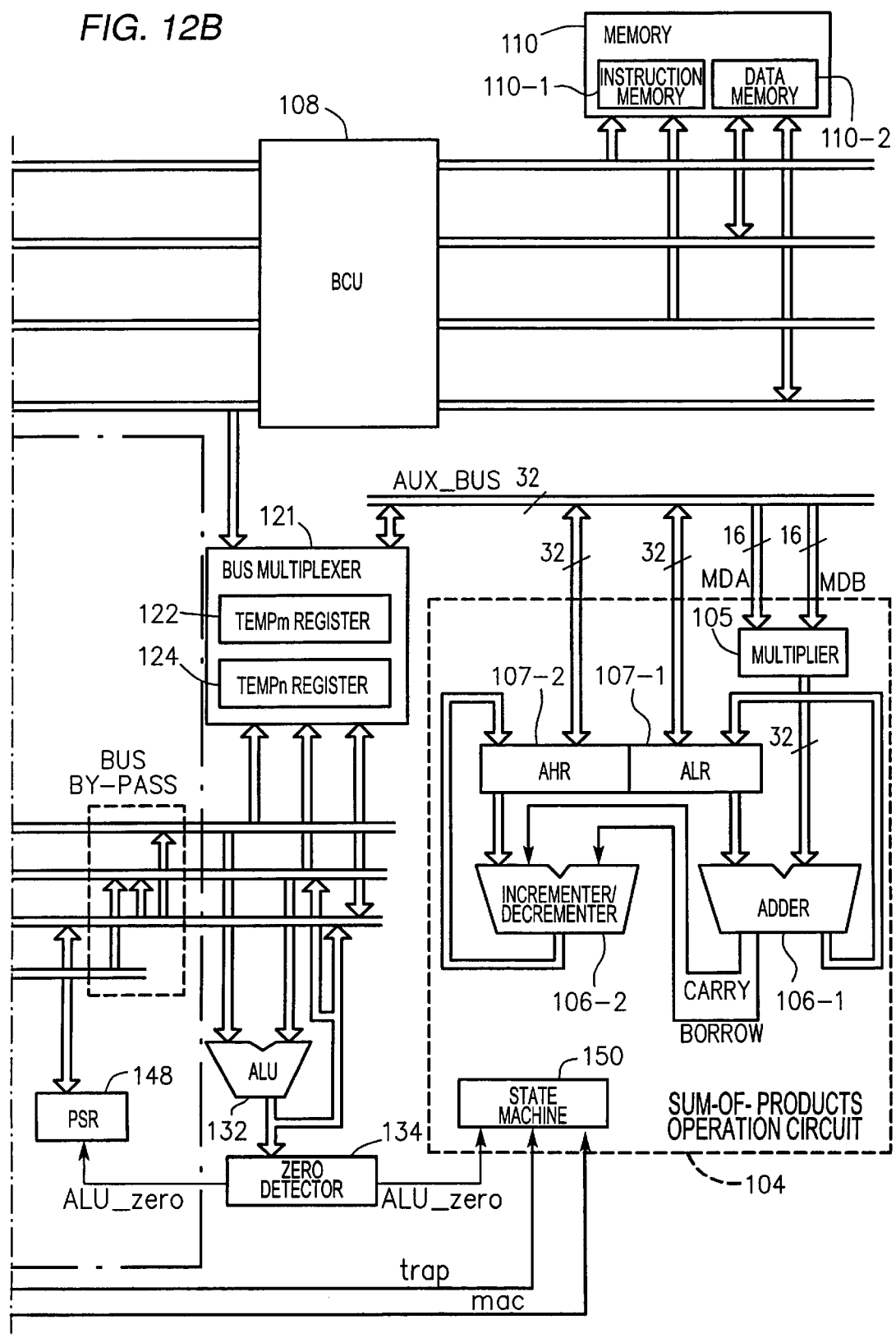

In FIG. 12, I_ADDR_BUS denotes an instruction address bus and I_DATA_BUS denotes an instruction data bus. These buses are used for reading instructions such as a sum-of-products operation instruction from an instruction memory 110-1. D_ADDR_BUS denotes a data address bus and D_DATA_BUS denotes a data bus, and these buses are used for reading data such as the first and second sum-of-products input data MDA and MDB from a data memory 110-2. Thus a bus configuration called the Harvard architecture is employed by this embodiment.

PA_BUS, PB_BUS, WW_BUS, and XA_BUS are internal buses, and AUX_BUS is a bus for exchanging data between the control circuit 102 and the sum-of-products operation circuit 104. IA and DA are for outputting addresses from the control circuit 102 (CPU) to I_ADDR_BUS and D_ADDR_BUS, respectively. DIN is for inputting data from D_DATA_BUS to the control circuit 102, and DOUT is for outputting data from the control circuit 102 to D_DATA_BUS.

An instruction decoder 140 receives and also analyzes instructions that are input from I_DATA_BUS, then outputs various control signals that are necessary for the execution of these instructions. For example, various directions corresponding to each instruction are sent to the components of the control circuit 102 through an immediate value generator 142. When an interrupt is received from the interrupt controller 130 (see FIG. 1), TRAP VECTOR for activating the interrupt handler is output over the D_ADDR_BUS and also a trap signal is activated (becomes 1), to inform the sum-of-products operation circuit 104 that an interrupt has been generated. Similarly, whenever a sum-of-products operation instruction is received, a mac signal becomes active to inform the sum-of-products operation circuit 104 that a sum-of-products operation instruction has been generated.

The immediate value generator 142 generates 32-bit immediate data to be used during the execution of the instruction and 0, ±1, ±2, and ±4 constant data necessary for the execution of each instruction, based on the immediate value comprised within the instruction. A PC incrementer 118 increments the value in the PC 120 every time one instruction is executed. An address adder 144 performs an add, using the information stored in the various registers and the immediate data generated by the immediate value generator 142, and generates the addresses necessary for reading from the memory 110.

The general-purpose register 103 comprises sixteen 32-bit registers R0 to R15. An SP 146 is a dedicated 32-bit stack pointer register which stores a stack pointer that indicates the start address in the stack. A processor status register (PSR) 148 is a 32-bit register that stores various flags.

The ALU 132 performs arithmetic and logical operations; in this embodiment it decrements the number of executions. If the result of the operation performed by the ALU 132 is zero, a zero detector 134 activates an ALU_zero signal (makes it 1). This causes a zero flag in the PSR 148 to be set and also informs the sum-of-products operation circuit 104 that the number of executions has reached zero. A bus multiplexer 121 selects one of the PA_BUS, PB_BUS, and WW_BUS and connects it to AUX_BUS. The bus multiplexer 121 comprises the TEMPm register 122 and the TEMPn register 124 and outputs the first and second sum-of-products input data MDA and MDB to the sum-of-products operation circuit 104 when both data are present.

The sum-of-products operation circuit 104 comprises a state machine 150. This state machine 150 controls the state of the sum-of-products operation circuit 104, based on various signals such as ALU_zero, trap, and mac.

Figure 13:
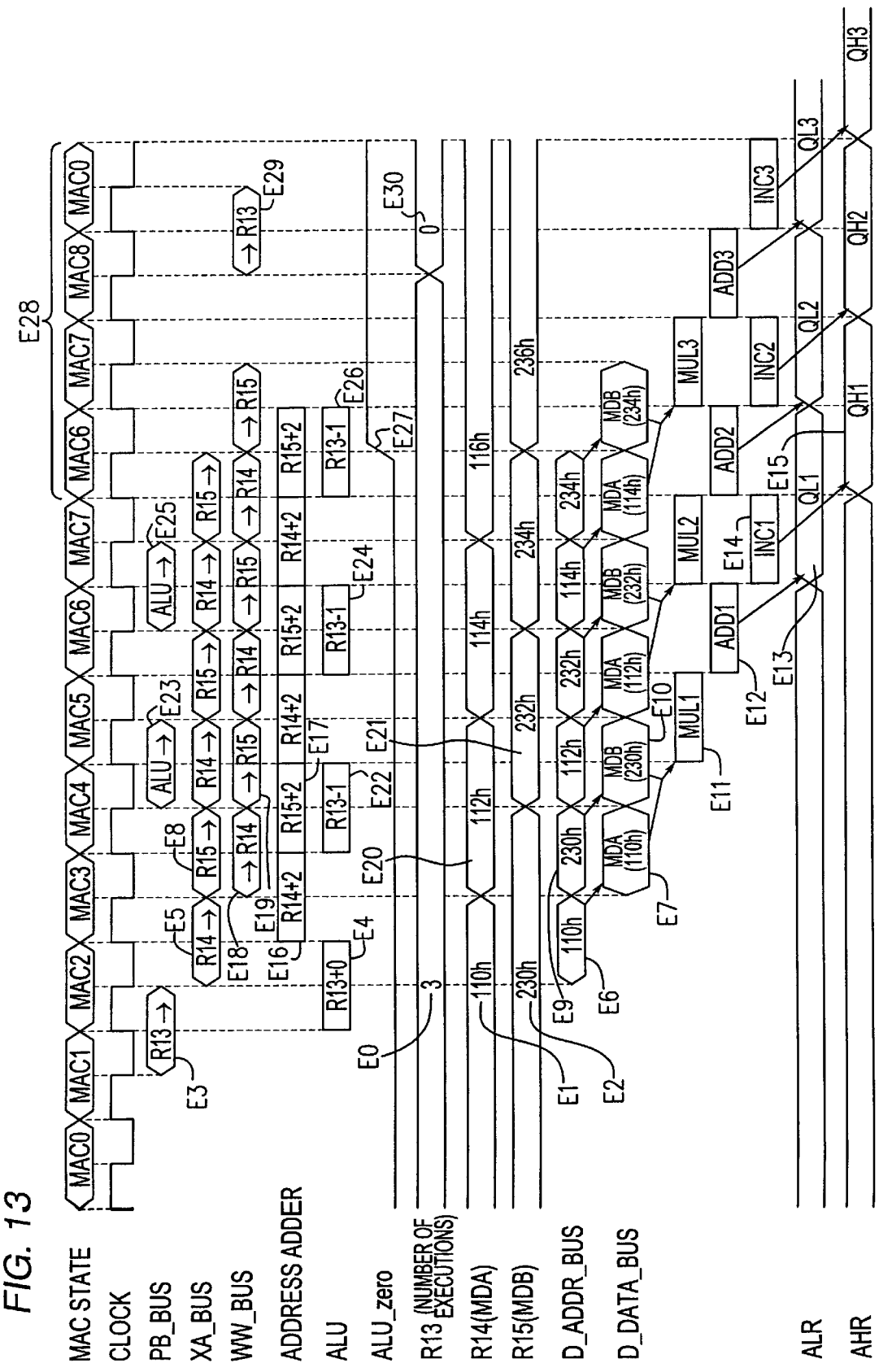
FIG. 13 is an example of a timing chart for Embodiment 5.
Figures 14A, 14B:
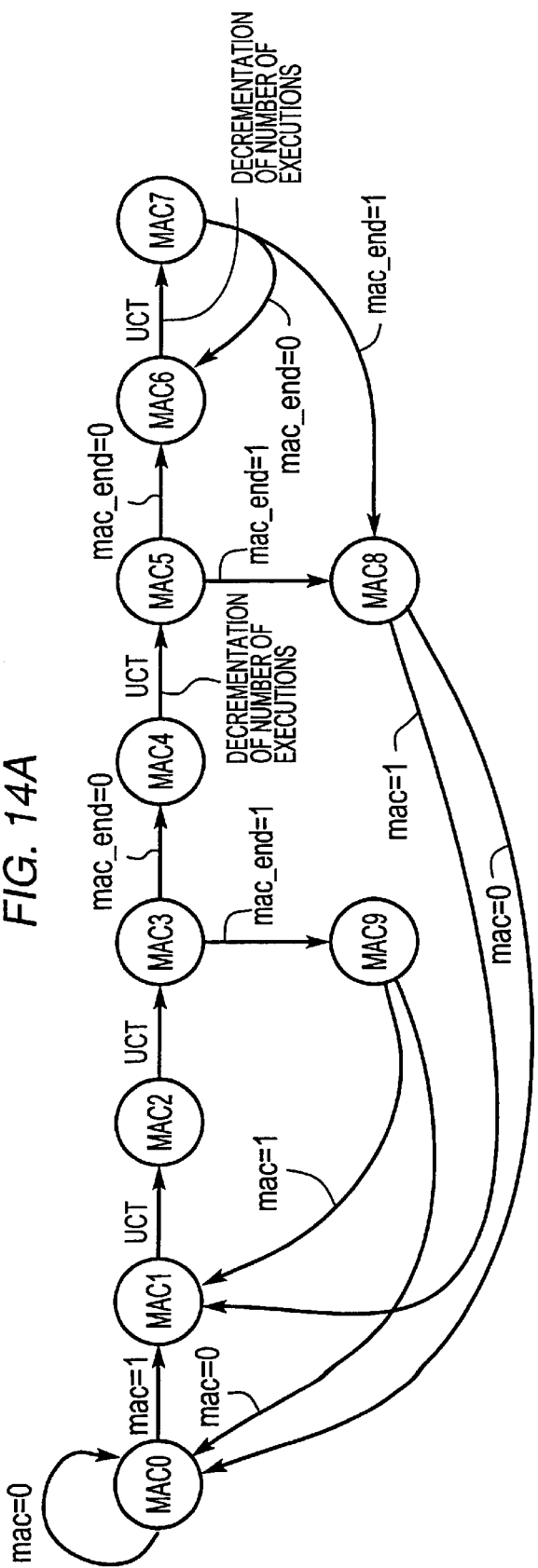
FIGS. 14A and 14B are diagrams illustrating the operation of the state machine.

MAC states (MAC0 to MAC8) shown in the timing chart of FIG. 13 represent the states of the sum-of-products operation circuit 104 (the state machine 150) and a state transition diagram thereof is shown in FIG. 14A. The meanings of the signals in this state transition diagram are as follows:

(1) mac

This signal becomes 1 (active) when the instruction decoder 140 receives a sum-of-products operation instruction.

(2) mac_end

This signal becomes 1 when the end condition for a sum-of-products operation instruction is raised; more specifically, it becomes 1 when mac_zero or mac_trap becomes 1.

(3) mac_zero

This signal becomes 1 when the number of times the sum-of-products operation is to be executed reaches zero. In this case, mac_zero becomes 0 when the microcomputer is reset or the MAC state becomes MAC8 or MAC9, as shown in FIG. 14B. It also becomes 1 if the ALU_zero signal from the zero detector becomes 1 when the MAC state is MAC3, MAC5, or MAC7.

(4) mac_trap

This signal becomes 1 when an interrupt occurs during the execution of the sum-of-products operation instruction. In this case, mac_trap becomes 0 when the microcomputer is reset or the MAC state becomes MAC8 or MAC9, as shown in FIG. 14B. It also becomes 1 if the trap signal from the instruction decoder 140 becomes 1 when the MAC state is MAC5 or MAC7.

The MAC state stays at MAC0 it mac become 0 but no sum-of-products operation instruction is issued, as shown in FIG. 14A. On the other hand, the MAC state changes to MAC1 if mac becomes 1. The transitions from MAC1 to MAC2 and from MAC2 to MAC3 are unconditional (UCT) and are in synchronization with the clock signal.

MAC3 changes to MAC9 it mac_end becomes 1, and this also resets mac_end to 0 (see FIG. 14B). After a transition to MAC9, the state returns to MAC1 if mac is 1 or to MAC0 if mac is 0. If mac_end is 0, MAC3 changes to MAC4.

The transition from MAC4 to MAC5 is unconditional, in synchronization with the clock signal. During this time, it is possible that mac_zero will become 1 because of a decrement of the number of executions (see E22 in FIG. 13). At MAC5, a determination is made as to whether or not mac_end is 1; if it is 1 the state changes to MAC8, then returns from MAC8 to MAC0 or MAC1. If mac_end is 0, on the other hand, the state changes from MAC5 to MAC6.

The transition from MAC6 to MAC7 is unconditional, in synchronization with the clock signal. During this time, it is possible that mac_zero will become 1 because of a decrement of the number of executions (see E24 and E26 in FIG. 13). At MAC7, a determination is made as to whether or not mac_end is 1; if it is 1 the state changes to MAC8; if it is 0, it returns to MAC6.

If the number of times the sum-of-products operation is to be executed has been set 0, for example, the MAC state first changes in the sequence: MAC0, MAC1, MAC2, then MAC3. Since mac_end then becomes 1 (mac_zero becomes 1), the state changes from MAC3 to MAC9 then MAC0 (or MAC1).

If the number of executions has been set to 1, the MAC state first changes in the sequence: MAC0, MAC1, MAC2, MAC3, then MAC4. The number of executions is decremented at the transition from MAC4 to MAC5, so mac_end becomes 1. As a result, the MAC state changes from MAC4 to MAC5, MAC8, then MAC0 (or MAC1).

If the number of executions has been set to 2, the MAC state changes in the sequence: MAC0, MAC1, MAC2, MAC3, MAC4, MAC5, MAC6, MAC7, MAC8, then MAC0 (or MAC1). In other words, the number of executions is decremented between MAC4 and MAC5 and between MAC6 and MAC7, to become zero. Note that if the number of executions is set to be 3 or more, the operation of changing from MAC6 to MAC7 and back to MAC6 is repeated until the number of executions reaches zero.

When an interrupt request has occurred, a determination is made as to whether or not mac_trap has become 1 (mac_end has become 1) at the point at which the state has changed to MAC5 or MAC7, and the state changes to MAC8.

One characteristic feature of the state machine 150 of this embodiment is that the MAC state returns to the initial state MAC0 (or MAC1), based on the mac_end signal becoming active when the sum-of-products operation has been completed the desired number of times (mac_zero becomes 1) or when an interrupt request has occurred (mac_trap becomes 1). This configuration makes it possible to utilize state transitions used when the sum-of-products operation has been completed the desired number of times, as state transitions used when an interrupt request has occurred. This makes it possible to simplify the configuration of the state machine 150.

The operation of this embodiment will now be described with reference to FIG. 13. FIG. 13 is a timing chart when the number of times the sum-of-products operation is to be executed has been set to 3. This means that, in this case, the MAC state changes from MAC0 to MAC1, MAC2, MAC3, MAC4, MAC5. MAC6, MAC7, MAC5, MAC7, MAC8, then MAC0. In this embodiment, the general-purpose register R13 acts as a register for the number of executions and 3 is set as the number of executions therein (see E0 in FIG. 13). R14 and R15 act as registers for the first and second sum-of-products input data MDA and MDB, and start addresses 110h and 230h for the memory areas containing MDA and MDB are stored therein (see E1 and E2).

When the instruction decoder 140 of FIG. 12 receives a sum-of-products operation instruction, mac becomes 1 and the MAC state changes from MAC0 to MAC1.

The number of executions stored in R13 is then output to the ALU 132 over the PB_BUS (E3) The ALU 132 adds zero to this number of executions (E4). This add of zero is to check whether or not the number of executions was initially set to zero. If it is zero, ALU_zero becomes 1 and the sum-of-products operation instruction ends (see MAC3 and MAC9 in FIG. 14A).

The address 110h stored in R14 is then output to D_ADDR_BUS over the XA_BUS (E5 and E6). The first sum-of-products input data MDA (110h) is read from the memory 110, based on that address (E7). In a similar manner, the address 230h stored in R15 is output to D_ADDR_BUS over the XA_BUS (E8 and E9), and the second sum-of-products input data MDB (230h) is read from the memory 110, based on that address (E10). The multiplier 105 multiplies these values MDA and MDB (E11), the adder 106-1 adds the multiplication result (E12), and the add result is stored in the ALR 107-1 (E13). If a carry or borrow is generated by this add, the incrementer/decrementer 106-2 performs an increment or decrement (E14) and stores the result the AHR 107-2 (E15).

The addresses 110h and 230h stored in R14 and R15 are also output to the address adder 144 over the XA_BUS (E5 and E8). The address adder 144 adds 2 to each of these addresses (E16 and E17), and returns the results of these additions to the registers R14 and R15 over the WW_BUS (E18 and E19). This changes the addresses stored in R14 and R15 to 112h and 232h (E20 and E21), enabling the read of the next sum-of-products input data MDA (112h) and MDB (232h).

The ALU 132 decrements the number of executions from 3 to 2 at MAC 4 (E22). The thus decremented number of executions is output to the PB_BUS, then returned from the PB_BUS and input to the ALU 132 (E23). The ALU 132 then decrements the number of executions from 2 to 1 (E24). The thus decremented number of executions is returned and input to the ALU 132 (E25). The ALU 132 then decrements the number of executions from 1 to 0 (E26) ALU_zero becomes 1 because the number of executions has reached 0 (E27). The MAC state changes from MAC6 to MAC7, MAC8, then MAC0 (E28), ending the execution of the sum-of-products operation instruction. At this point, the number of executions that has been decremented 0 is stored in R13 over the WW_BUS (E29 and E30).

Figure 15:
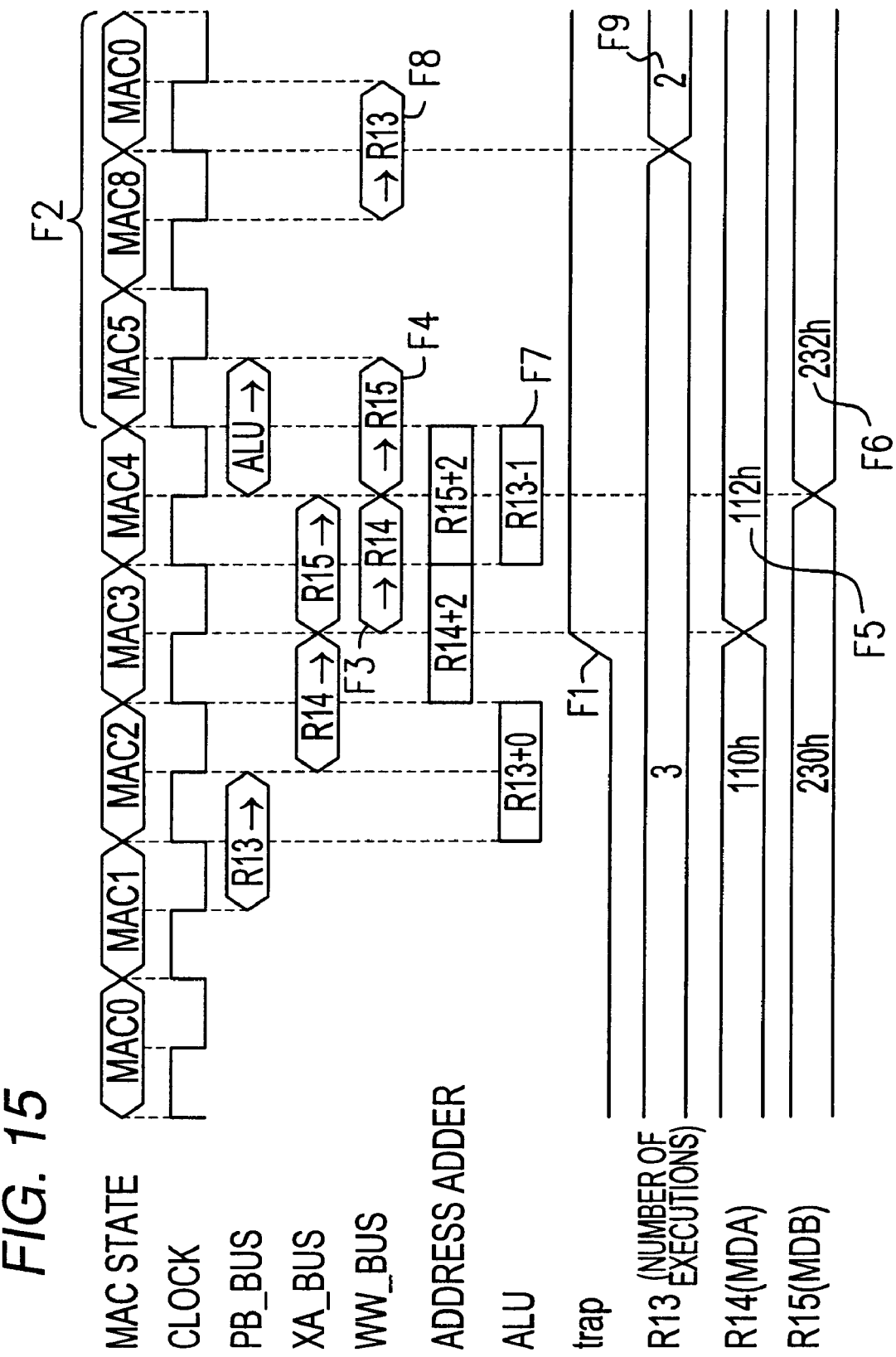
FIG. 15 is an example of a timing chart during interrupt generation.

The operation of this embodiment when an interrupt occurs will now be described with reference to the timing chart of FIG. 15. In the situation shown in FIG. 15 by way of example, an interrupt occurs and the trap signal becomes 1 when the MAC state is MAC3 (F1 in FIG. 15). In this case, this embodiment performs the same process as that when no interrupt occurs in the next state, which is MAC4. When the MAC state changes to MAC5, the processing for changing from MAC5 to MAC8 then MAC0 is first performed (F2).

In other words, this embodiment returns the MAC state to the initial state MAC0 (or MAC1) after changing the contents of the registers R14 and R15 to contents that will be used when execution resumes after the end of interrupt processing (F3, F4, F5, and F6). This ensures that execution of the sum-of-products operations can be resumed in a suitable manner after the interrupt processing ends, based on the sum-of-products input data MDA and MDB at addresses 112h and 232h.

In this embodiment, the MAC state returns to the original state after decrementing the number of times the sum-of-products operation is to be executed (F7). Therefore, the number of executions, which is 2 after the decrement, is stored in R13 (F8 and F9), enabling the resumption of the execution of the remaining two sum-of-products operations after the interrupt processing has ended.

This processing makes it possible to implement the various processes described in the sections on Embodiments 1, 2 and 4. To implement the processing of Embodiment 3, note that the reading of the sum-of-products input data MDA and MDB from memory could be done in a single memory access (1 clock).

Embodiment 6

A sixth embodiment relates to a microcomputer to which this invention is applied.

Figure 16:
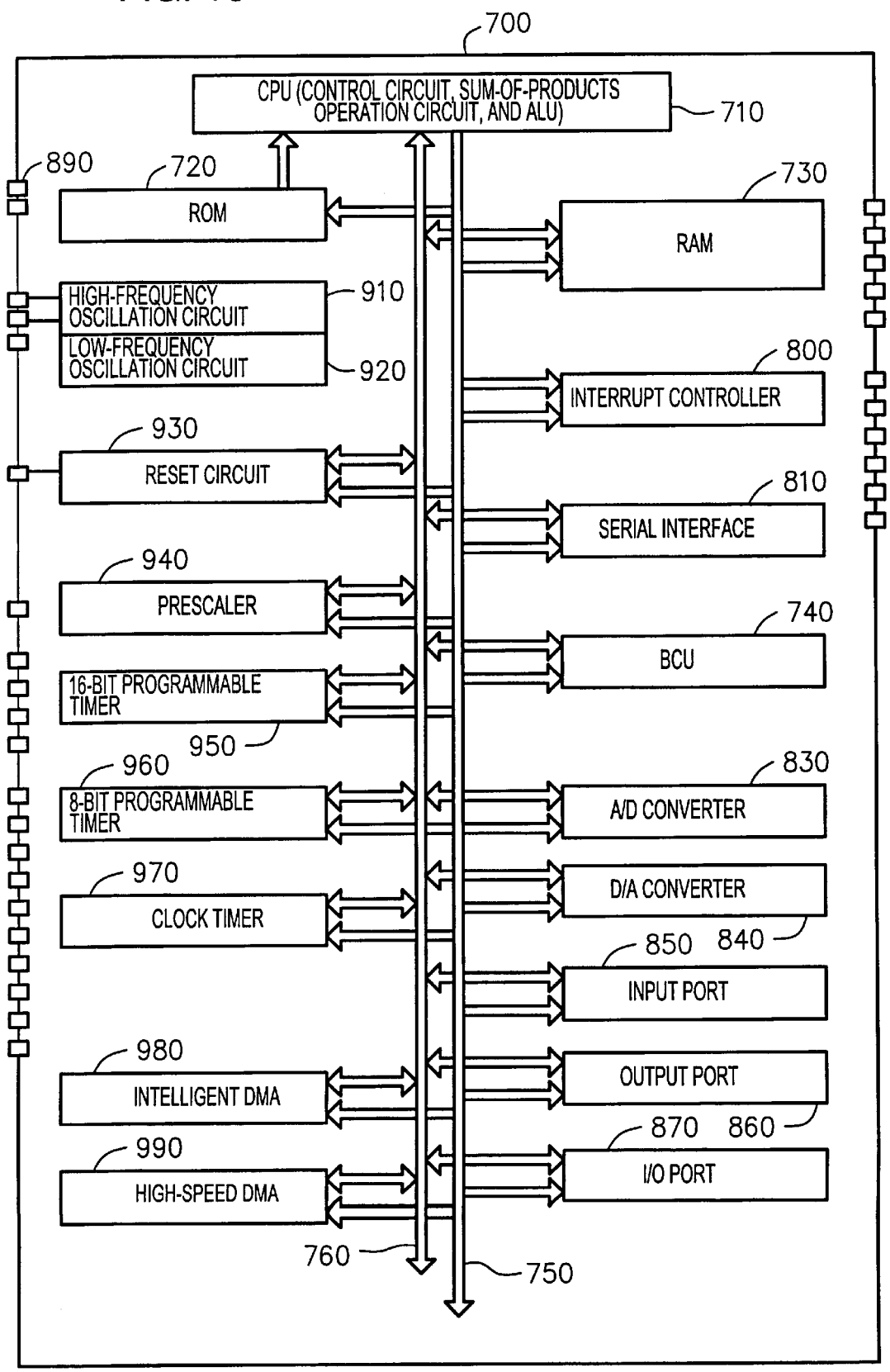
FIG. 16 is a configurational example of the microcomputer of Embodiment 6.

As shown in FIG. 16, a microcomputer 700 in accordance with Embodiment 6 is a 32-bit microcomputer that comprises a CPU (control circuit, sum-of-products operation circuit, and ALU) 710; ROM 720; RAM 730; a high-frequency oscillation circuit 910; a low-frequency oscillation circuit 920; a reset circuit 930; a prescaler 940; timer circuitry comprising a 16-bit programmable timer 950, a 8-bit programmable timer 960, and a clock timer 970; a data transfer control circuit comprising an intelligent direct memory access (DMA) controller 980 and a high-speed DMA controller 990; an interrupt controller 800; a serial interface 810; a BCU 740; analog interface circuitry comprising an A/D converter 830 and a D/A converter 840; I/O circuitry comprising an input port 850, an output port 860, and an I/O port 870; buses 750 and 760 connecting these components together, and pins 890.

This microcomputer 700 is a reduced instruction set computer (RISC) formed on a one-chip semiconductor substrate, which can process 32-bit data. It utilizes an architecture using pipeline and load/store methods, and executes substantially all of its instructions within a single clock period. All the instructions are defined within a 16-bit fixed length, enabling an extremely small instruction code size.

As described above with respect to Embodiments 1 to 5, the CPU 710 is designed to be capable of executing a plurality of sum-of-products operations by a single sum-of-products operation instruction. This means that the microcomputer 700 can be used for processing that could only be done by a DSP or dedicated image-processing or sound-processing IC, making it possible to reduce the cost and size of electronic equipment in which this microcomputer 700 is incorporated.

Embodiment 7

A seventh embodiment of this invention relates to electronic equipment comprising one of the microcomputers described above with reference to Embodiments 1 to 6.

Figure 17A:
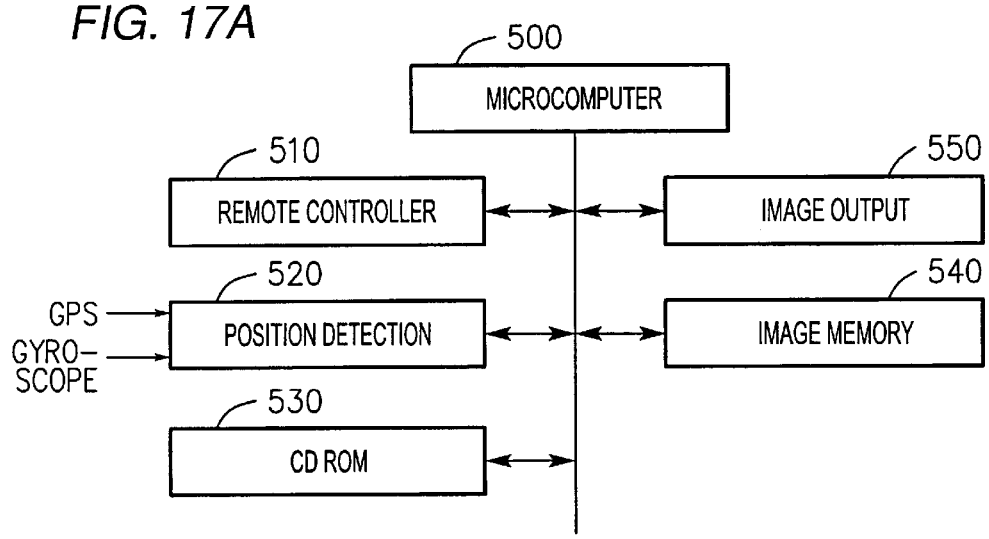
FIGS. 17A, 17B, and 17C are examples of block diagrams of various items of electronic equipment.
Figure 18A:
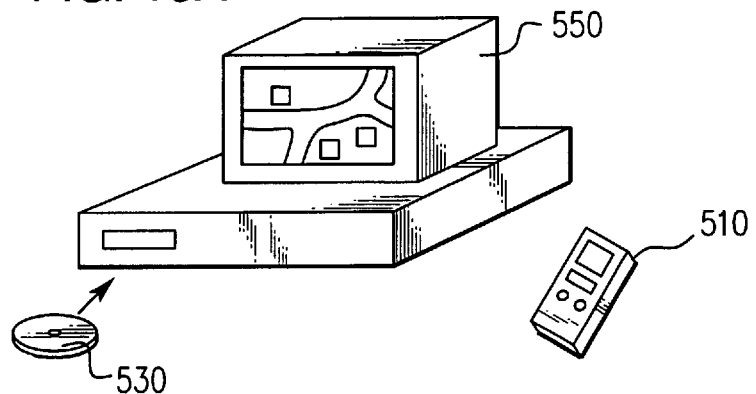
FIGS. 18A, 18B, and 18C are examples of external views of various items of electronic equipment.

An internal block diagram of a car navigation system that is one type of electronic equipment is shown in FIG. 17A, with an external view thereof shown in FIG. 18A. A remote controller 510 is used for operating this car navigation system, and a position detection portion 520 detects the position of the vehicle on the basis of information from a global positioning system (GPS) or gyroscope. Information such as a map is stored in a CD-ROM 530 (information storage medium). An image memory 540 acts as a work area during image processing, and images generated thereby are displayed to the driver on an image output portion 550. A microcomputer 500 receives data from data input sources such as the remote controller 510, the position detection portion 520, and the CD-ROM 530, performs various processes, and uses an output device such as the image output portion 550 to output the thus processed data.

In car navigation systems up until now, the image processing (graphics processing) has been done by DSPs or dedicated image-processing ICs. This means that there have to be two processors in such electronic equipment, such as a complex instruction set computer (CISC) and a DSP, for example, and thus the system is complicated. Use of the microcomputers described in the sections on Embodiments 1 to 6 makes it possible to execution a plurality of sum-of-products operations efficiently, making it possible to implement the image processing necessary for a car navigation system without having to use a DSP.

Figure 17B:
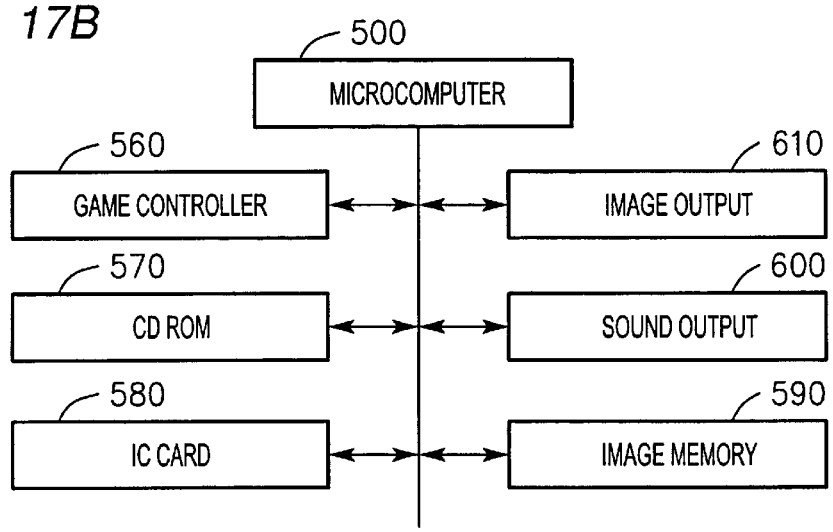
Figure 18B:
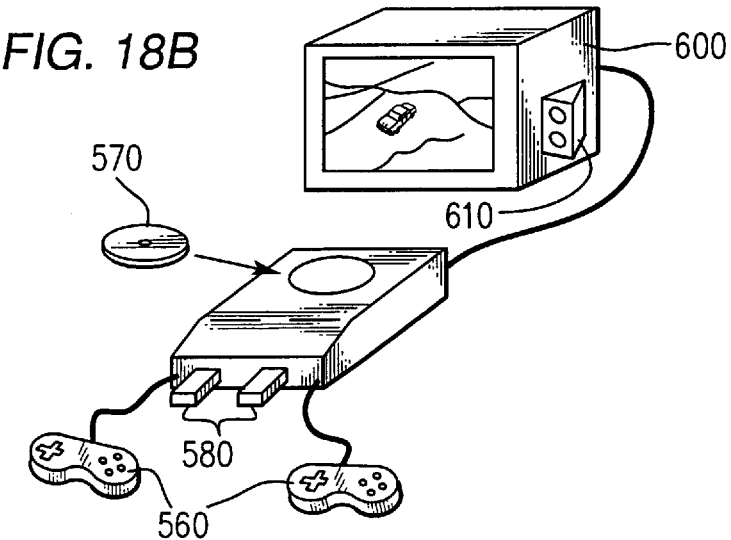

An internal block diagram of a game machine that is another type of electronic equipment is shown in FIG. 17B, with an external view thereof shown in FIG. 18B. This game machine uses an image memory 590 as a work area to create game images and sounds, based on data such as the player's operating information from a game controller 560, a game program on a CD-ROM 570, and player information on an IC card 580, and uses an image output portion 610 and a sound output portion 600 to output them. This microcomputer 500 in this case uses the sum-of-products operation functions described with respect to Embodiments 1 to 6 to perform three-dimensional image processing such as coordinate transformation, perspective transformation, and clipping, and sound processing such as sound compression and expansion.

Figure 17C:
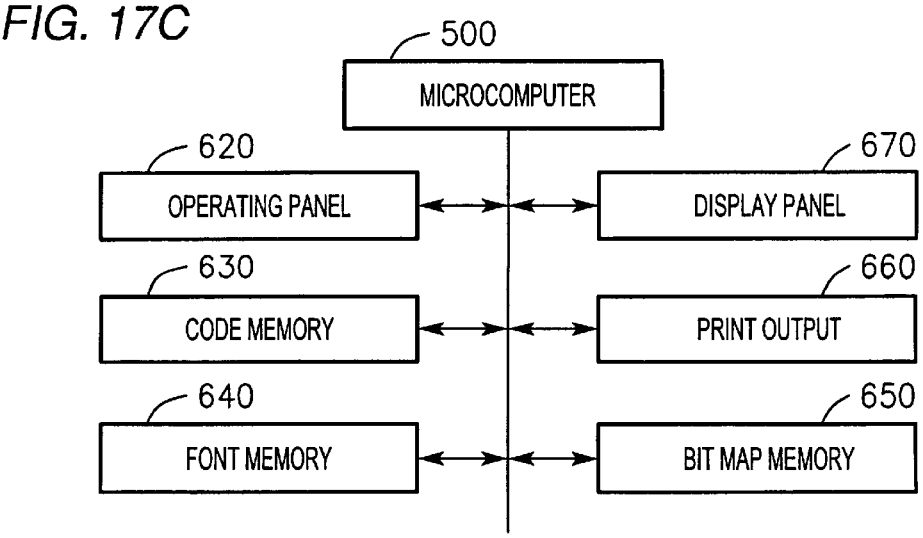
Figure 18C:
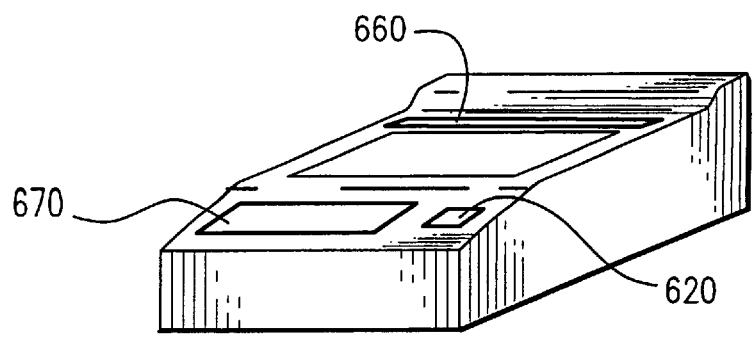

An internal block diagram of a printer that is yet another type of electronic equipment is shown in FIG. 17C, with an external view thereof shown in FIG. 18C. This printer uses a bitmap memory 650 as a work area to create a print image, based on operating information from an operating panel 620 and character information from a code memory 630 and a font memory 640, and uses a print output portion 660 to output it. This printer also uses a display panel 670 to inform the user of its status and mode. The microcomputer 500 in this case uses the sum-of-products operation functions described with respect to Embodiments 1 to 6 to draw straight lines and circular arcs, and scale images.

Note that the microcomputer of this invention can be applied to various other items of electronic equipment in addition to those described above, such as a cellular phone, a personal handyphone system (PHS), a pager, audio equipment, electronic notebooks, electronic calculators, terminals for point of sales (POS) system, devices provided with touch-panels, projectors, wordprocessors, personal computers, televisions, and video tape recorders with either view-finders or monitors.

Note also that this invention is not limited to the above described Embodiments 1 to 7; it can be modified in many various ways within the scope of the invention defined herein.

For example, the technique of specifying the number of times the sum-of-products operation is to be executed by a sum-of-products operation instruction is not limited to the embodiments described above and can be modified in various ways.

Similarly, the information processing circuit of this invention is particularly valid when applied to a microcomputer, especially a RISC microcomputer, but it can also be used in other applications.

Furthermore, the configuration of the sum-of-products operation instruction is not limited to the embodiments described above, and it can also be modified in various ways.

What is claimed is:

1. An information processing circuit comprising:
   a control circuit that receives instructions, the instructions including a single sum-of-products operation instruction, that analyzes said instructions, and that controls the execution of said instructions, and
   a sum-of-products operation circuit that executes a sum-of-products operation under the control of said control circuit, based on said single sum-of-products operation instruction; wherein:
      said sum-of-products operation circuit executes a sum-of-products operation a number of times, based on said single sum-of-products operation instruction,
      said number of times that the sum-of-products operation is to be executed is stored in a register accessed by said control circuit; and said single sum-of-products operation instruction comprises number-of-executions information specified by the number of times that the sum-of-products operation is to be executed stored in said register.

2. The information processing circuit as defined in claim 1, further comprising:
a circuit that decrements a number of times that the sum-of-products operation is to be executed, in synchronization with the execution of a sum-of-products operation, where said number of times is stored in the register accessed by said control circuit;
wherein said sum-of-products operation circuit executes sum-of-products operations until said number of executions reaches a given value.

3. The information processing circuit as defined in claim 1, wherein:
said sum-of-products operation instruction comprises an operand that specifies one register from a group of registers;
said group of registers comprises at least the register for the number of times that the sum-of-products operation is to be executed, a register for first sum-of-products input data, and a register for second sum-of-products input data; and
wherein said control circuit specifies a register other than said one register from the group of registers, according to a given rule based on said operand that specifies said one register.

4. The information processing circuit as defined in claim 1, wherein said sum-of-products operation instruction comprises an operand that specifies the register for the number of times that the sum-of-products operation is to be executed, an operand that specifies a register for first sum-of-products input data, and an operand that specifies a register for second sum-of-products input data.

5. The information processing circuit as defined in claim 1, wherein:
said control circuit comprises at least one of a dedicated register for the number of times that the sum-of-products operation is to be executed, a dedicated register for first sum-of-products input data, and a dedicated register for second sum-of-products input data; and
said sum-of-products operation instruction comprises an operation code which uses said at least one dedicated register as an implicit operand.

6. The information processing circuit as defined in claim 1, wherein, if an interrupt request has occurred during the execution of said single sum-of-products operation instruction, said control circuit receives said interrupt request, temporarily ends the execution of said single sum-of-products operation instruction without incrementing a program counter, and re-executes said single sum-of-products operation instruction after interrupt processing has ended.

7. The information processing circuit as defined in claim 6, wherein, after the end of interrupt processing, said control circuit re-executes said single sum-of-products operation instruction, based on the contents at the interrupt processing branch point of registers for said number of times that the sum-of-products operation is to be executed, first sum-of-products input data, and second sum-of-products input data.

8. The information processing circuit as defined in claim 6, further comprising:
a state machine that returns said sum-of-products operation circuit to an initial state, based on a signal that goes active either when sum-of-products operations have been executed a number of times specified by said number-of-executions information or when said interrupt request has occurred.

9. The information processing circuit as defined in claim 6, further comprising:
a state machine that returns said sum-of-products operation circuit to an initial state, after changing the contents of registers for first sum-of-products input data and second sum-of-products input data to contents to be used when execution of said sum-of-products operations resumes.

10. The information processing circuit used with a memory, as defined in claim 1, wherein said control circuit controls the reading of first and second sum-of-products input data by a single memory access from adjacent areas in the memory at which said first and second sum-of-products input data are stored.

11. The information processing circuit as defined in claim 1, wherein said sum-of-products operation circuit:
multiplies first and second sum-of-products input data in a first stage of a pipeline process;
adds the result of said first-stage multiplication to data stored in a register specified to hold a first sum-of-products result, in a second stage of said pipeline process; and
increments or decrements data that is stored in a register specified to hold a second sum-of-products result, in a third stage of said pipeline process, when either a carry or a borrow is generated by said second-stage addition.

12. A microcomputer integrated onto a semiconductor substrate, comprising:
the information processing circuit as defined claim 1; and
at least one of a bus control circuit, memory, interrupt controller, timer circuit, analog interface circuit, data transfer control circuit, and I/O circuit.

13. Electronic equipment comprising:
the microcomputer as defined in claim 12;
an input source for data to be processed by said microcomputer; and
an output device for outputting data that has been processed by said microcomputer.

14. An information processing circuit used with a memory, comprising:
a control circuit that receives instructions that comprise a sum-of-products operation instruction, that analyzes said instructions, and that controls the execution of said instructions; and
a sum-of-products operation circuit that executes a sum-of-products operation under the control of said control circuit, based on said single sum-of-products operation instruction; wherein:
said control circuit controls the reading of first and second sum-of-products input data by a single memory access from adjacent areas in the memory at which said first and second sum-of-products input data are stored.

15. The information processing circuit as defined in claim 14,
wherein when data transfer between said control circuit and said memory is over a $2^n$-bit bus, the upper $2^{n-1}$ bits of the thus-transferred data is handled as said first sum-of-products input data and the lower $2^{n-1}$ bits of the transferred data is handled as said second sum-of-products input data.

16. A microcomputer integrated onto a semiconductor substrate, comprising:

the information processing circuit as defined in claim 14; and at least one of a bus control circuit, memory, interrupt controller, timer circuit, analog interface circuit, data transfer control circuit, and I/O circuit.

17. Electronic equipment comprising:

the microcomputer as defined in claim 16;

an input source for data to be processed by said microcomputer; and an output device that outputs data that has been processed by said microcomputer.

18. An information processing circuit comprising:

a control circuit that receives instructions that comprise a sum-of-products operation instruction, that analyzes said instructions, and that controls the execution of said instructions; and a sum-of-products operation circuit that executes a sum-of-products operation under the control of said control circuit, based on said sum-of-products operation instruction, wherein said sum-of-products operation circuit:

multiplies first and second sum-of-products input data in a first stage of a pipeline process;

adds the result of said first-stage multiplication to data stored in a register specified to hold a first sum-of-products result, in a second stage of said pipeline process; and increments or decrements data that is stored in a register specified to hold a second sum-of-products result, in a third stage of said pipeline process, when either a carry or a borrow is generated by said second-stage addition.

19. The information processing circuit as defined in claim 18, wherein said sum-of-products operation circuit comprises:

said registers specified to hold the first and second sum-of-products results;

a multiplier that multiplies said first and second sum-of-products input data;

an adder that adds the result of the multiplication of said multiplier to data stored in said register for the first sum-of-products result; and a circuit that increments or decrements data stored in said register for the second sum-of-products result, based on a carry signal or a borrow signal from said adder.

20. The information processing circuit as defined in claim 18, wherein each of said first and second sum-of-products input data is $2^{n-1}$-bit data and each of said registers for the first and second sum-of-products results is a $2^n$-bit register.

21. A microcomputer integrated onto a semiconductor substrate, comprising:

the information processing circuit as defined in claim 18; and at least one of a bus control circuit, memory, interrupt controller, timer circuit, analog interface circuit, data transfer control circuit, and I/O circuit.

22. Electronic equipment comprising:

the microcomputer as defined in claim 21;

an input source for data to be processed by said microcomputer; and an output device that outputs data that has been processed by said microcomputer.

* * * * *